(12) United States Patent
Kobayashi et al.

(10) Patent No.: US 7,716,384 B2
(45) Date of Patent: May 11, 2010

(54) REMOVABLE DEVICE AND CONTROL CIRCUIT FOR ALLOWING A MEDIUM INSERTION

(75) Inventors: Shinya Kobayashi, Tokyo (JP); Shinji Uematsu, Tokyo (JP)

(73) Assignee: Saslite Corp., Tokyo (JP)

( * ) Notice: Subject to any disclaimer, the term of this patent is extended or adjusted under 35 U.S.C. 154(b) by 1110 days.

(21) Appl. No.: 10/533,219

(22) PCT Filed: Oct. 31, 2003

(86) PCT No.: PCT/JP03/14038

§ 371 (c)(1),
(2), (4) Date: Feb. 27, 2006

(87) PCT Pub. No.: WO2004/040428

PCT Pub. Date: May 13, 2004

(65) Prior Publication Data

US 2006/0173980 A1    Aug. 3, 2006

(30) Foreign Application Priority Data

Nov. 1, 2002  (JP)  ............................ 2002-320382
Nov. 8, 2002  (JP)  ............................ 2002-325931
Feb. 26, 2003 (JP)  ............................ 2003-048564

(51) Int. Cl.
  *G06F 3/00*   (2006.01)
  *G06F 13/00*  (2006.01)
  *G06F 11/30*  (2006.01)
(52) U.S. Cl. .......................... 710/10; 710/13; 711/170; 711/173; 713/193
(58) Field of Classification Search ..................... 710/1, 710/8, 10, 13, 62; 711/100, 170, 173; 713/1, 713/2, 150, 168, 189, 193; 726/2, 16, 17, 726/19, 20, 26–28
See application file for complete search history.

(56) References Cited

U.S. PATENT DOCUMENTS

| 6,311,193  | B1  |   | 10/2001 | Sekido |
| 6,654,797  | B1  | * | 11/2003 | Kamper ...................... 709/220 |
| 7,222,240  | B2  | * | 5/2007  | Elteto ......................... 713/185 |
| 2002/0003576 | A1 | * | 1/2002  | Konishi et al. .............. 348/232 |
| 2003/0226006 | A1 | * | 12/2003 | Ballard ......................... 713/1 |

(Continued)

FOREIGN PATENT DOCUMENTS

JP            07-078102           3/1995

(Continued)

*Primary Examiner*—Alford W Kindred
*Assistant Examiner*—Richard Franklin
(74) *Attorney, Agent, or Firm*—Drinker Biddle & Reath LLP

(57) ABSTRACT

The present invention provides a highly convenient removable device and a startup method. A hub division unit 31 in a single composite device 2 allocates data exchange with the computer 1 side a plurality of devices, thereby easily realizing a plurality of functions. When connected to a USB, a recognition control unit 32 returns a signal representing a CD-ROM in a simulated manner in response to inquiry about the type of the device from the host side. When a device is mounted, a desired processing such as a program execution described in the script is automatically performed without installing a resident program for detecting a device mounting in advance in the computer side.

17 Claims, 7 Drawing Sheets

U.S. PATENT DOCUMENTS

2003/0233533 A1* 12/2003 Avraham .................. 713/1

FOREIGN PATENT DOCUMENTS

| JP | 11-120055 | 4/1999 |
|---|---|---|
| JP | 2000-194645 | 7/2000 |
| JP | 2000-242565 | 9/2000 |
| JP | 2000-298529 | 10/2000 |
| JP | 2001-154918 | 6/2001 |
| JP | 2001-202325 | 7/2001 |
| JP | 2001-222503 | 8/2001 |
| JP | 2001-256170 | 9/2001 |
| JP | 2001-265705 | 9/2001 |
| JP | 2002-032216 | 1/2002 |
| JP | 2003-150285 | 5/2003 |
| JP | 2003-178017 | 6/2003 |
| JP | 2004-094514 | 3/2004 |
| JP | 2004-151785 | 5/2004 |
| WO | WO 2004/038584 | 5/2004 |

* cited by examiner

REMOVABLE DEVICE AND CONTROL CIRCUIT FOR ALLOWING A MEDIUM INSERTION

BACKGROUND OF THE INVENTION

1. Field of the Invention

The present invention relates to a removable device and a log-in method capable of producing superior advertising effects and offering superior convenience and security.

2. Description of the Background Art

Along with the continued growth in the use of various computers, such as personal computers (PCs), which accompanies the increasing use and progress in semiconductor technology and the Internet, recent years have seen diversification in the methods used for connecting peripheral devices. As a result, a need has been created for a universal peripheral device interface that can be used for any personal computer models and the USB (Universal Serial Bus) interface has been proposed as a specific example of such a standard. Moreover, reductions in the weight and size of various computers and the expansion of their portable (mobile) uses have created a need for removable external storage devices, fueling the growing popularity of USB memory, which is a device that can be easily connected to a personal computer via the USB interface. USB memory has various storage capacities, including 32 MB, 64 MB, etc. More specifically, it is a removable device of the size of a person's thumb that is furnished with a flash memory element inside and, when connected to a USB port (connection port) of a personal computer etc. via a USB connector provided at one of its ends, is recognized as a removable (attachable/detachable) disk drive, etc., and permits access, such as reading/writing, and the like.

Nowadays the use of the Internet is becoming particularly widespread and using rented/borrowed computers other than the one normally used while away from home is becoming a more frequent practice, so that, for instance, in many cases one sends and receives e-mail using a personal computer rented by the hour at an Internet cafe, etc. or borrowed from other people, such as colleagues at the office, customers, family members, friends and acquaintances, etc. Normally, personal computers at such temporary locations do not have data such as one's sent and received e-mail or account information, and the type and version of their e-mail programs (software used for electronic mail) are not the same as those of one's favorite e-mail program. Furthermore, while one may consider setting up one's account information on another person's PC in order to send and receive e-mail, in such a case, privacy problems may arise as a result of forgetting to erase data concerning such account information and sent/received e-mail. Thus, some people resort to recording data etc. concerning such account information, e-mail software, and sent/received e-mail in a USB memory and carrying it along with them.

In other words, not only data, but software, such as e-mail programs, etc., and shortcuts to software can be stored in a USB memory as well, and, in addition to saving and reading data, the USB memory can be used to perform the startup of such software. In addition to reading, it can also be used for starting such software.

In addition, in recent years, in addition to PC-specific peripherals, such as external storage devices, etc., it has become possible to connect a personal computer to digital cameras and various other devices in order to exchange data with the personal computer.

When a new peripheral device is connected to a personal computer, installation of dedicated programs, such as device drivers and supporting software, is required in many cases, and in the past, such programs were provided to the user on storage media such as CD-ROMs, floppy disks, etc. In addition, the user has been encouraged to download such programs from a network.

However, the problem was that when users tried to use target data and software stored in a USB memory, reaching them involved burdensome operations, with the burden increasing particularly as the frequency of use of the USB memory increased.

For instance, using data stored in a USB memory required performing a corresponding complex procedure, in the course of which users not only inserted a USB memory into a personal computer, but also performed operations on the OS (Operating System, i.e. basic software) screen by going through sequential options, such as "My Computer"→"Removable Disk"→"Target Operation", or specified a file name for execution via the keyboard.

In addition to that, when a memory was misplaced or stolen, user data stored on it could be inadvertently read by other people, thereby creating security concerns.

Additionally, installing dedicated programs from storage media was rather troublesome in terms of attaching/detaching the media from the personal computer, and, in addition, bundling them with the product required space, making it more difficult to reduce the size of product packaging and cluttering the users' storage space. In addition, another problem was that, depending on the type of the storage media, it was at times necessary to go through several levels of options in order to get to the target files, making the entire operation burdensome and complicated. In addition, the problem with downloading from a network was that such a method could not be used without a network connection.

In addition, as electronic communications and information represented by the Internet are becoming one of the main tools of mass communication in the present, there have been proposed various advertising methods, such as banner advertising, popup advertising, constantly displayed advertisements of free-of-charge connections, affiliated programs, etc. Such advertising lured the user to advertisements and electronic commerce sites, displaying advertisements whose content was tailored to the user's attributes by identifying the user from the so-called cookie information.

However, in the conventional advertising techniques described above, the exposure of the user to banner and other advertising was completely dependent on whether the user launched a web browser. For this reason, before a browser is launched, advertisements could not be displayed, and, conversely, after starting the browser, the user was already interested in viewing a particular website. Thus, advertisements used to give the impression of being something annoying that users were forced to view, and advertisements such as banners tended to be ignored without stirring any interest, resulting in a paradoxical situation in which advertisers, who forced users to pay attention to them, were instead disliked and shunned.

In addition, since it was, in fact, difficult to effectively relate cookie information to user attributes, advertising based on conventional technology was neither an opt-in scheme, which is based on advance agreement registration, nor an opt-out scheme, in which refusal can be registered in advance, and, consequently, became indiscriminate, making effective advertising difficult.

In addition to the above mentioned problems, when a user borrowed a computer from others, effective advertising was rendered even more difficult because user identification based on cookie information did not achieve its original purpose.

The present invention is proposed to solve the above described problems of the conventional technology, and its object is to provide a removable device offering superior convenience and security. It is another object of the present invention to implement particularly superior level of information security for removable USB devices and related technologies. In addition, yet another object of the present invention is to provide a highly universal control circuit for the present invention. Additionally, still another object of the present invention is to provide a removable USB device and related technologies that can be used under many operating systems without special device drivers.

In addition, another object of the present invention is to provide a compact removable device that automatically installs software programs. Also, yet another object of the present invention is to make simplification of system configuration and response speed improvements possible after the installation of programs such as device drivers etc. used for externally connected devices.

In addition, still another object of the present invention is to provide a log-in method and a removable device offering superior advertising effects.

SUMMARY OF THE INVENTION

In order to attain the above-mentioned object, according to one aspect of the present invention, there is provided a removable device, which is attached/detached to/from a universal peripheral device interface of a computer executing a specified automatic startup script or an auto-starting program stored in a device of a specified type when the device is connected thereto, comprising: a controller; and a ROM or a read/writable storage device as its main storage device, wherein the means includes a hub allocator for allocating data exchange with the computer to each of a plurality of unit devices including a first unit device and a second unit device, and means a transmitter which, upon connection to the universal peripheral device interface, initially sends a first signal simulating a device of the specified type in which an automatic startup script or an auto-starting program is stored in the storage device and executed by the computer to which the device is attached, on account of the first unit device, and then, at a predetermined timing, sends the computer a specified signal used for accepting recognition on account of the second unit device.

According to another aspect of the present invention, there is provided a firmware program for a control circuit of a removable device which is attached/detached to/from a universal peripheral device interface of a computer executing a specified automatic startup script or an auto-starting program stored in a device of a specified type when the device is connected thereto and including control means and a ROM or a read/writable storage device as its main storage device, wherein; the program causes the control circuit to allocate data exchange with the computer to a plurality of unit devices including a first unit device and a second unit device, and upon connection to the universal peripheral device interface, to send a first signal simulating a device of the specified type in which an automatic startup script or auto-starting program is stored in the storage device and executed by a computer to which the device is attached on account of the first unit device, and then, at a predetermined timing, to send the computer a specified signal used for accepting recognition on account of the second unit device.

In these embodiments, sending the computer a signal simulating a first unit device as a device of a specified type (for example, a CD-ROM drive), on which automatic startup of programs, etc. is to be run, causes the execution of the desired scripts or programs (hereinafter called "programs, etc.") to be started even if a peripheral device utilizing a USB memory, etc. is used, and a different second unit device is recognized afterwards, at a predetermined timing. As a result, access to the second unit device is limited to the programs etc., which makes it possible to maintain secrecy. In this manner, providing a time difference between the automatic startup of the programs etc. and recognition makes it possible to offer a removable device of superior convenience and security.

In addition, providing a time difference between the automatic startup of programs etc. and recognition as described above allows for setting up a digital camera or another peripheral device as a second unit device and carrying out advance installation of its device drivers with the help of the programs, etc. as well as makes it possible to provide a removable device that automatically installs programs and is compact in size because it permits miniaturization using flash memory.

The removable wherein store an auto-starting program invoked by the automatic startup script or the auto-starting program, and the auto-starting program supplies may supply the means an instruction that causes the computer to recognize the second unit device when a user is authenticated by password by the computer, supplies may supply the means an instruction to format data in the second unit device when an incorrect password is entered a specified number of times during the authentication, and may periodically sends specified recognition extension signals to the means controller, and the means controller may include a data formatter for executing the formatting instruction and a canceller for canceling the recognition of the second unit device by the computer when the recognition extension signals are interrupted for specified period of time.

In this embodiment, as a result of running the auto-starting program, recognition of the second unit device is preconditioned by password authentication, such that, if a password is entered incorrectly several times, the device is formatted and, if the program terminates, recognition is canceled, thereby making access difficult except for the auto-starting program, which helps maintain superior security.

The removable device may further comprise: a connector for connecting another peripheral device, and the controller may include a data allocator for setting up all or part of the main storage device as a first unit device and the other peripheral device as a second unit device and allocating data exchange with the computer side to each of the unit devices.

In this embodiment, at the beginning, a signal simulating the first unit device as a device of a specified type (for example, a CD-ROM drive), on which automatic startup of programs, etc. is to be run, is sent to the computer. As a result, even if a peripheral device utilizing a USB memory, etc. is used, the desired programs, etc. can be automatically executed, and recognition of another second unit device is carried out afterwards at a predetermined timing. Thus, the second unit device can be a digital camera or another peripheral device and the execution of installers for dedicated programs, such as device drivers for the other peripheral device, is facilitated by connecting the other peripheral device to the computer via the removable device of the present invention by providing both male and female connectors in the removable device of the present invention or integrating it with the other peripheral device as a component for a built-in board. As a result, the use of actual CD-ROMs and other unwieldy storage media, as well as burdensome procedures required by dedicated software programs is rendered unnecessary.

If the removable device of the present invention is integrated with the other peripheral device, the removable device of the present invention can be set to permit pass-through when connected for the second time or later by controlling its inner circuitry with a changeover switch, thereby establishing a direct connection between the computer and the other peripheral device, or, otherwise, whenever connected, it can be caused to proceed with the recognition of the second unit device immediately so long as the programs etc. confirm the presence of the dedicated software programs on the computer and their installation is complete. If the removable device of the present invention is physically separate from the other peripheral device, then the computer can be directly linked to the other peripheral device without interposing the removable device of the present invention in between.

The controller may include a signal transmitter which, upon connection to the universal peripheral device interface, first, sends a specified signal used for accepting recognition on account of the first unit device, and, when a program read and executed from the recognized first unit device sends a specified cue signal, sends the computer a specified signal used for accepting recognition on account of the second unit device.

In this embodiment, an installation program stored in advance in the first unit device, which is recognized first, is manually started by the user and a cue signal is sent when the installation is complete, such that recognition of the second unit device is carried out. By doing so, device drivers and other dedicated software programs can be readily provided to the user via a compact removable device without using automatic program startup.

The auto-starting program may acquire a drive letter of each of the unit devices on the computer and transmits the same to the removable device.

As a result, regardless of the environment, such as an OS, etc., applications and other programs can identify data location in the removable device, thereby enabling smooth access to such data.

According to another aspect of the present invention, there is provided a removable devices, comprising: a rewritable non-volatile memory; and a controller for mediating access from a USB host side to the memory, wherein: the controller upon connection to the host side, connects a portion of the memory to the host side, and, upon reception of a specified cue signal from the host, connects another portion of the memory to the host side.

As a result, by sending a cue signal from the host upon user authentication, information stored in the other portion of the memory is protected from third parties lacking proper authority, thereby implementing information security.

According to another aspect of the present invention, there is provided a control circuit mediating, as a USB client, access from a host side via USB to a rewritable non-volatile memory, wherein the circuit includes: a slave side connection port for external device connection; a region manager for partitioned management of the memory as a plurality of regions; a hub simulator for connecting and disconnecting the regions and external devices, which are connected to the slave side connection port, to and from the host as a plurality of unit devices divided by the hub; and a command interpreter for detecting and executing dedicated command sent from the host side and including at least command for connection of any of the unit devices.

According to another aspect of the present invention, there is provided a firmware program for a control circuit mediating, as a USB client, access from the host side via USB to a rewritable non-volatile memory, wherein the program causes the control circuit to carry out partitioned management of the memory as a plurality of regions, to connect and disconnect the regions and external devices connected to the slave side connection port used for external device connection, to and from the host side as a plurality of unit devices divided by the hub, and to detect and execute dedicated command sent from the host and including; at least connection of any of the unit devices.

A simulated CD-ROM format-compatible region may be used as one of the regions, and in case the host side accesses the simulated CD-ROM format-compatible region configured in the non-volatile memory using the CD-ROM format, the circuit may perform conversion between such access and access in the non-volatile memory format.

In these embodiments, external devices and a plurality of regions produced by partitioning the memory can be connected to, and disconnected from, the host side in the desired combinations and at the desired timing, thereby making it possible to implement a highly universal control circuit that can be utilized for a security drive or for installation of device drivers used for external peripheral devices.

An invisible region different from the regions may be provided with the help of the partitioned management in the non-volatile memory, and access to information in the invisible region may be authorized exclusively based on the dedicated command.

The program may cause the control circuit to provide an invisible region different from the regions in the non-volatile memory with the help of the partitioned management, and access to information in the invisible region is authorized exclusively based on the dedicated command.

In these embodiments, IDs, passwords, license keys, partitioned management system information, and other particularly important information is effectively protected from cracking, blocking, and other threats.

In the firmware program the program may cause the control circuit to perform partitioned management of the memory as a plurality of regions and an invisible region that is different from these regions and has a specified password stored therein, to connect, upon connection to the host side, one of the regions to the host side as a single device connected to the hub, and to connect another region of the regions to the host as another device connected to the hub when a specified dedicated command is sent from the host side or when a password sent from the host side matches the specified password stored in the invisible region.

The command interpreter may detect the dedicated command when bit patterns corresponding to the parameters and type of the command are stored in a specified register region provided in the memory, and may place a result of command execution into a specified register region in the form of bit patterns.

The program may cause the control circuit to detect the dedicated command when bit patterns corresponding to the parameters and type of the command is stored in a specified register region provided in the memory, and to place a result of command execution into a specified register region as a bit pattern.

The command interpreter may detect, with respect to the dedicated command, patterns corresponding to their parameters and the type of the commands from accesses to specified contents, specified file names, specified physical addresses in any of the unit devices, any of the unit devices, or the hub.

The program may cause the control circuit to detect, with respect to the dedicated command, patterns corresponding to their parameters and the type of the commands from accesses to specified contents, specified file names, specified physical addresses in any of the unit devices, any of the unit devices, or the hub.

In the control circuit at least any of the following is performed in accordance with the type of the dedicated command.
- (a) connecting, disconnecting, and acquiring a status of unit devices
- (b) reading and writing information to the invisible region
- (c) reading individually specific identifying information
- (d) modifying region volume
- (e) rewriting and updating the simulated CD-ROM format-compatible region These embodiments can be used under many operating systems without special devices drivers because the special commands can be transmitted from the host side to the control circuit via ordinary read/write access, etc.

The control circuit may further comprise a switch port for switching connection of the simulated CD-ROM format-compatible region to the host side on and off.

By doing so, it is possible to simplify system configuration and improve response speed after installation of programs such as device drivers used for externally connected devices because the CD-ROM region can be disconnected with a switch and kept off.

The CD-ROM format-compatible region may be connected to the host side whenever a command to initialize external devices connected to the slave side connection port is not sent from the host side within a certain time after connection to the host.

Doing so makes it easily to determine whether device drivers for downstream peripheral devices have been installed on a personal computer based on the presence/absence of the initialization command and renders unnecessary burdensome procedures such as turning a switch on/off after installation.

Data recorded in a specified region of the non-volatile memory may be encrypted and data read therefrom is decrypted.

The program may cause the control circuit to encrypt data recorded in a specified region of the non-volatile memory and to decrypt data read therefrom.

In these embodiments, security is strengthened even more because data saved in the portion that is later connected and recognized upon authentication is protected by encryption, e.g. using the private key/public key system, etc.

The removable device may comprise the control circuit and a switch used to select whether a peripheral device connected to the slave side connection port is immediately connected to the host side.

In this embodiment, when external peripheral devices are connected for the first time, the user waits for the installation of device drivers and other dedicated programs to complete and then connects the external peripheral devices to the host side, so that, by turning a switch on, the peripheral devices can be connected to the host side immediately next time or later, which enables system configuration simplification and response speed improvements. In addition, operation is further facilitated if it is also used as a switch for turning the connection of the simulated CD-ROM format-compatible region to the host on and off.

The removable device may further comprise a first connector for connecting a mobile phone terminal using a wired or wireless connection; and a second connector for connecting the same to a telephone network via an IP connection provided on a computer operating as a host side.

This makes it easy to use economical IP telephony of superior convenience and security from anywhere and at any time using IP networks, such as the Internet, etc., the personal computer, and the send/receive functions of mobile phones.

According to another aspect of the present invention, there is provided an information processing method in a control circuit of a removable device implementing removable device according to claim 1.

According to another aspect of the present invention, there is provided a circuit design pattern for a control circuit of a removable device implementing removable device according 24.

According to another aspect of the present invention, there is provided a removable device which is attached/detached to/from a universal peripheral device interface of a computer executing a specified auto-starting program stored in a device of a specified type when the device is connected thereto, comprising: a controller; and a ROM or a read/writable storage device as its main storage device, wherein the auto-starting program is stored in main storage device in advance, the controller includes a transmitter for accepting recognition by sending the computer a signal simulating a device of the specified type in which the auto-starting program is stored in the storage device and executed by the computer to which the device is attached, upon connection to the universal peripheral device interface, and the auto-starting program, along with causing the computer to display, on its screen, a graphic element used for displaying a web page, causes the computer to display a corresponding web page in response to specified operations of selecting the graphic element.

In this embodiment, even with a peripheral device utilizing a USB memory, when it is mounted to a computer, it sends a signal simulating a device of a specified type, such as a CD-ROM drive. As a result, by running the auto-starting program, the computer can display banners etc. on web pages even before the user starts the browser and, moreover, can pre-set web pages that match the interests of the owner of the removable device in advance, thereby providing for effective advertising. In addition, the auto-starting program is free in form and it can be a script, a program, or a script-mediated program startup.

The graphic element may be stored in a specified protected storage region.

In this embodiment, storing graphic elements used for advertising in a specified protected storage region that is invisible and write-protected, etc. prevents inadvertent erasure and enables effective advertising.

The specified protected storage region may be realized by the controller including: an allocator which, along with managing the main storage device by dividing it into a plurality of unit devices including a first unit device storing the auto-starting program and a second unit device storing the graphic elements, allocates data exchange with the computer to the unit devices, and a signal transmitter which, first, sends the computer a signal simulating a device of the specified type on account of the first unit device and then authorizes access to the second unit device only for as long as specified signals are sent from the automatically started auto-starting program.

In this embodiment, the same state is implemented as if a plurality of peripheral devices were connected via a hub using LSI etc. and inadvertent erasure of advertisement-related data, such as image files containing the graphic elements, can be prevented by allowing the first unit device to be recognized first, thereby causing the auto-starting program to be started automatically, and then authorizing access to the second unit device only during the operation of the auto-starting program, which has functions enabling it to display the graphic elements, etc.

The auto-starting program, based on access to a predetermined server system, may acquire at least one of information identifying the web page, and information concerning the graphic elements.

In this embodiment, obtaining web page and graphic element-related information from a specified server makes effective advertising possible based on a flexible approach involving modification of the web page and graphic element-related information in accordance with the rates of access by individual users.

According to another aspect of the present invention, there is provided a log-in method for logging in from a client system into a web server system, comprising: storing information specifying the web server system and log-in information for user identification and authentication utilized for logging into the web server system on a client system in advance; at the time of the log-in, sending them from the client system to a specified relay server, transferring the log-in information to the web server system by the relay server; and via the relay server, causing a web browser provided on the client system to reflect a user-specific starting URL by the web server system, when the user is successfully authenticated by the log-in information.

In this embodiment, server login is automated, which makes processing faster and easier both when the user receives certain membership services from the server as a result of login and when the user is identified in order to narrow down the target audience of advertising. In addition, the automatic login performed by the program reduces the risk of passwords being recorded and misused by spyware or by a password cache on a borrowed personal computer. In addition, various management functions, such as changing advertisers or establishing access rates for each member, are rendered reliable and easy by logging in via a relay server.

The log-in method may further comprise sending updated information used for accessing a web page from the relay server to the client system logged into the web server system; and along with detecting the arrival of the updated information, announcing it by displaying it on screen, and accepting operations for access to the web page.

In this embodiment, users who have accessed the web page are presented with news about sales, etc. and other information in a push-type information distribution format.

According to another aspect of the present invention, there is provided a removable device, which is attached/detached to/from a universal peripheral device interface of a computer executing a prescribed automatic startup script or an auto-starting program stored in a device of a specified type when the device is connected thereto, comprising: control means; and a ROM or a read/writable storage device as its main storage device, wherein the control means includes hub means for allocating data exchange with the computer to each of a plurality of unit devices including a first unit device and a second unit device, and means which, upon connection to the universal peripheral device interface, first, sends a first signal simulating a device of a specified type in which an automatic startup script or an auto-starting program is stored in the storage device and executed by the computer to which the device is attached, on account of the first unit device, and then, at a specified timing, sends the computer a second signal used for accepting recognition on account of the second unit device.

Figure 1:
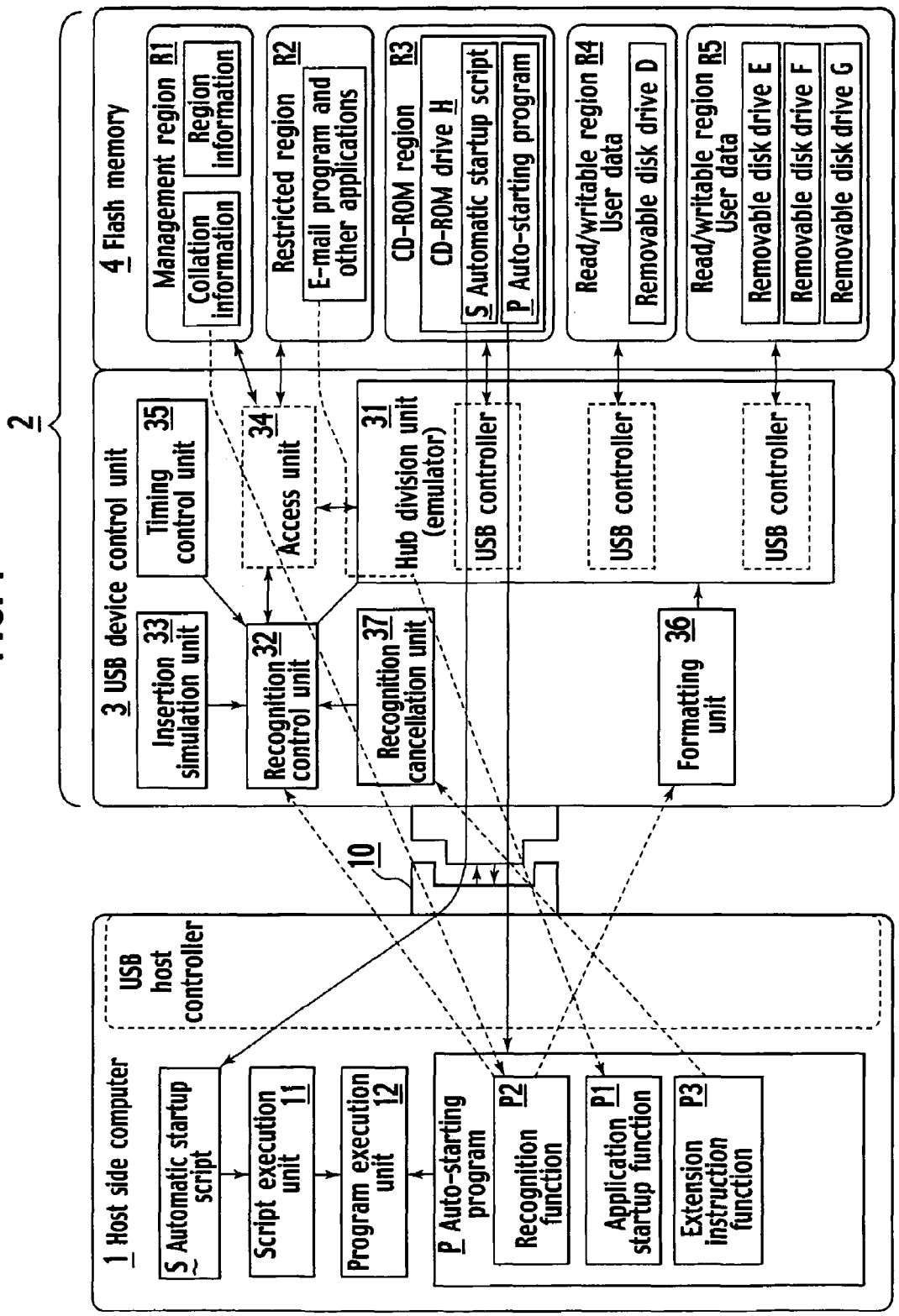
FIG. 1 is a functional block diagram illustrating the configuration of a first embodiment of the present invention.

The reference numerals are as shown below.
1 Computer
2, 20 Removable device
3 USB device control unit
4 Flash memory
5 Digital camera
6 Web server system
7 Relay server
10, 25 USB port
11 Script execution unit
12 Program execution unit
31 Hub division unit
32 Recognition control unit
33 Insertion simulation unit
34 Access unit
35 Timing control unit
36 Formatting unit
37 Recognition cancellation unit
S Automatic startup script
P Auto-starting program
R1~R5 Regions
200 Device
210 LED
220 Write protection switch
230 CD-ROM switch
300, 350 USB microcomputers
310, 360 Firmware
400 Flash memory
410 CD-ROM region
420 HDD region
430 Invisible region
435 Management information
450, 460 Flash memory provided with control circuit
SW Switch
N Internet

DETAILED DESCRIPTION OF THE PREFERRED EMBODIMENTS

Next, a number of modes for practicing the invention (respectively called "embodiments" below) are specifically described by referring to drawings. In addition, while each embodiment can be realized with the help of programs and wired logic on dedicated LSI chips, in such a case, the hardware and programs may have various modifications, which is why a virtual circuit block is used below to realize the functions of the embodiments and the present invention.

0. Outline of First Embodiment

The first embodiment facilitates the use of data that only the owner of the device stores in a connected personal computer, in a USB memory-type device, in which e-mail and other personal information is stored.

To implement the device, the device of the first embodiment is furnished with a CD-ROM compatible region for storing applications and other dedicated software programs and a so-called "autorun" function for automatically starting programs from this region. In addition, it has an HDD-compatible region for data storage. The device has a storage region and command transmitting means that can be used only from the dedicated programs and can connect/disconnect the regions based on specified commands from the dedicated programs.

1. Configuration of First Embodiment

First of all, FIG. 1 is a functional block diagram showing a schematic configuration of first embodiment. Namely, first embodiment is a removable composite device (hereinafter called "composite device") 2, which is used by attaching/detaching it to/from a computer 1, and the computer 1 includes a USB as a universal peripheral device interface. Specifically, the computer 1 includes a USB port 10, a USB host controller, and a device driver necessary for the USB. Below, in relation to the USB, the computer 1 is called the "host side" or "computer side".

In addition, the composite device 2 is attached/detached to/from a USB port 10 of the computer, and while in this example it includes a read/writable flash memory 4 as its main storage device, a small hard disk drive or a ROM can be also used as the main storage device. Furthermore, the composite device 2 includes a USB device control unit 3 as control means.

In the USB device control unit 3, various components operating in the following manner shown in FIG. 1 are realized with the help of wired logic of custom chips such as ASIC and FPGA or based on a combination of a CPU, built-in programs, or micro-programs, etc., and, in addition, in the computer 1, various components operating in the following manner shown in FIG. 1 are realized based on the operation of an OS or other programs.

2. Operation of First Embodiment

Specifically, first embodiment has the following operation and effects.

2-1. Hub Division

A hub division unit 31 of the USB device control unit 3 provides hub means for easily realizing a plurality of functions by performing an operation (called "hub division" below) of allocating data exchange with the computer 1 side to a plurality of devices (respectively called "unit devices") in a single composite device 2. As for specific embodiments of hub division, one may consider:

(1) Miniaturizing a universal USB hub and incorporating it into the device.

(2) Allowing the USB controller of a single device to manage a plurality of device components.

(3) Emulating the USB controllers of unit devices and the hub with the help of LSI using ASIC and other custom chips, general-purpose CPUs and built-in programs, etc.

and, while it is possible to consider various appropriate combinations thereof, here an emulator of a USB controller is used.

Based on this type of hub division, a CD ROM region R3 and read-writable regions R4 and R5 are set up in a storage area of a flash memory 4. The CD-ROM drive (drive letter "H", called a first unit device) set up in the CD-ROM region R3 and the removable disk drive (drive letter "D", called a second unit device) set up in the read-writable region R4 are unit devices, but the regions themselves may be also viewed as unit devices.

Moreover, three removable disk drives (drive letters "E", "F", and "G") are set up by the hub division unit 31 in a read-writable region R5, with the three removable disk drives "E", "F", and "G" also constituting a single unit device. In addition, each removable disk drive "E", "F", and "G" may be individually regarded as a unit device.

Furthermore, a management region R1 and a restricted region R2, which are directly manageable and read/writable only from the access unit 34 of the USB device control unit 3, unlike the above-described unit devices on the USB, which are accessible from the host side, are set up in the storage area of the flash memory 4.

Here, in the regions R1 and R2, access from the OS for writing/deletion and regular recognition, etc. is prohibited, and for instance, information necessary for region management, etc. is placed in the management region R1. Moreover, in the restricted region R2, access for writing, deletion, etc. through the USB device control unit 3 is permitted only to an auto-starting program P described below, and e-mail programs and other application software, etc. are kept in this region. As a result, the software programs are protected from accidental deletion and illegal copying.

In addition, to handle information that has to be protected in the devices, a region, which can be read by the host side as a USB-connected unit device but which is write-protected, can be set up instead of the restricted region R2, and the information can be placed in such a region.

The read-writable region R4 permits free access as a regular removable disk, with presentation materials, word processor documents, address records, and electronic mail data used by e-mail programs placed in this region.

In addition, passwords can be set up for access to each of the regions, with collation information used for password authentication placed in a region inaccessible to the OS side, in the same manner as the regions R1 and R2.

If a plurality of regions handled in mutually different ways are set up as unit devices by the hub division unit 31 in the above-described manner, then whenever data have to be saved via simulated recognition to the removable devices, including unit devices handled as a CD-ROM, there is no need to consider the specific file system of an actual CD-ROM and data can be easily saved in a type of unit device that does not require data conversion, such as a removable disk drive or an HDD, etc.

2-2. Simulated Recognition

Incidentally, some OS (for example, the Microsoft® Windows® series) execute a specified script file on a medium (for example, "Autorun.inf") whenever the medium is inserted into a device of the specified type (for example, a CD-ROM). The computer 1 is assumed to be provided with such an OS.

Moreover, if there is a device that may be mounted to the USB, the host repeatedly sends periodic inquiry signals regarding the type of the device via the USB line, and, in response to the inquiry signals, the device newly mounted to the USB sends the host a reply regarding the device type to which it belongs, causing the host to recognize its connection to the host. Thus, when a device of the specified type is connected to the computer 1, the script execution unit 11 executes the automatic startup script stored in the device.

Thus, when connected to the USB, the recognition control unit 32 of the USB device control unit 3 responds to the host's inquiry signals regarding the type of the device in a simulated manner by sending a signal representing a CD-ROM. Out of the multiple unit devices, the simulated response is provided only with respect to the CD-ROM region R3. Moreover, the auto-starting program P launched by the automatic startup script S is stored on the CD-ROM drive H in the CD-ROM region R3.

Specifically, the removable device 2, i.e. the USB memory, is not the type of device supposed to be a target for script execution, but in response to an inquiry from the host, the recognition control unit 32 sends a signal representing that it is a target device for automatic startup script execution, such as a CD-ROM drive, etc., that is, a device descriptor.

For this reason, even if a resident program used for detection of attachment is not installed on the computer in advance, the desired processing, such as execution of the program recorded in the script, etc., takes place automatically when the device is mounted. As a result, various functions and uses of the device can be realized even without manually installing dedicated software etc. used for the device. Moreover, automatic startup of the desired programs from the removable device is also easily achieved on computers, where software cannot be installed because the user does not have administrator rights.

In addition, while this may be self-evident, it should be noted that, in fact, when the computer 1 accesses the first unit device (CD-ROM drive) configured in the main storage device (flash memory 4) in the format of the device of the specified type (CD-ROM drive), the control means (USB device control unit 3) performs conversion between such access and access in the format of the main storage device (flash memory 4).

2-3. Media Insertion

Moreover, in the above-described OS, inquiries as to the presence of attached medium are repeatedly sent to the device, causing it to respond, and when the "absent" state becomes a "present" state at a certain point, the change is recognized as media insertion.

Then, as explained above, even in cases where media insertion is a pre-condition for script execution, the script is executed smoothly and reliably by an insertion simulation unit 33 returning a signal of the same pattern as insertion in a simulated manner in response to inquiries as to the presence of media, although, unlike with actual devices, no media insertion is performed when the recognition control unit 32 is caused to respond to the effect that the device is the specified target device (for example, a CD-ROM) for script execution by the computer.

Namely, in response to the USB host controller's inquiry signals as to the presence of media repeated via the USB, the insertion simulation unit 33 returns a signal representing an absence of media at least once, and then, e.g. in response to a second inquiry, returns a signal representing a presence of media.

As a result, the OS of the computer 1 recognizes that media have been inserted and the script execution unit 11 of the computer 1 executes the automatic startup script S stored in the device. Although here the equipment of the "specified type", which is the target of script execution, is assumed to be a "CD-ROM", it can be changed and its scope can be expanded to include other types of devices. In addition, the program execution unit 12 provides means for executing executable files with the ".exe" extension and, as long as there is a record of the directory names, parameters, etc. of the executable files in the script, executes the executable files in accordance with that information.

In addition, in first embodiment, the execution of the auto-starting program P is specified in the automatic startup script S. Of course, in addition to that, the application startup function P1 of the auto-starting program P can be used to invoke, in a derivative manner, applications, such e-mail programs, and device driver installers for other peripheral devices, etc. Below, the derivatively invoked programs are also called auto-starting programs P.

2-4. Security Drive Based on Recognition Time Difference

In addition, the timing control unit 35 is a unit that controls the recognition control unit 32 such that it causes the computer 1 to recognize each unit device at a predetermined sequential timing. In other words, the recognition control unit 32 and the timing control unit 35 constitute means which, upon connection to the USB, initially sends the computer 1 a signal simulating a CD-ROM drive on account of the first unit device, and then, at a predetermined timing, sends the computer 1 a specified signal used for accepting recognition on the account of the second unit device.

Thus, in this case, immediately upon insertion of the composite device 2 to the computer 1, the timing control unit 35 sends the host side information indicating that only the first device has been connected, and, upon lapse of a specified time period, or as soon as a specified interaction with the host side ends, sends the host side information indicating that the second device has been connected.

As a result, the recognition of the second unit device is delayed by a preset time period or until the end of the specified interaction, which makes it possible to ensure a certain time difference. In addition, as far as the timing of recognition of the second unit device is concerned, instead of allowing the composite device side to make decisions about timing and conditions as described above, it may be set up to wait for specified instructions regarding recognition from a specified program executed on the host side, and, by doing so, allow the program on the host side to manage the timing of recognition of the second unit device, which makes it possible to confirm completion of specified processing. For instance, before the recognition of the second unit device is permitted, it waits for a notification of termination of password authentication or completion of device driver installation from the program.

In addition, instead of the USB device control unit 3, USB controllers may be provided in each individual unit device and the functions of the timing control unit 35 may be entrusted to the USB controllers.

Then, one of the uses of the above-described time difference consists in ensuring the necessary installation time for device drivers. In addition, another use of the time difference consists in improving data security so as to prevent easy access to the contents of some devices. Specifically, after causing the computer 1 to recognize the first unit device, the timing control unit 35 is configured to cause the computer 1 to recognize the second unit device in response to an instruction from the auto-starting program P, and if the auto-starting program P is imparted with a function for authenticating users based on passwords, etc., the second unit device can be used as a security drive offering superior level of security.

The convenience of the thus recognized security drive would be further improved if its recognition could be canceled (by "unplugging the device") by performing operations in the task tray etc. provided by the OS or if its recognition could be canceled as a function of the auto-starting program or another program launched in a derivative manner from the auto-starting program.

In other words, the security drive involves the following processing based on co-operation between the auto-starting program P and the USB device control unit 3. First of all, when a user is authenticated by password, the auto-starting program P gives the USB device control unit 3 an instruction to cause computer 1 to recognize the read/writable region R4, i.e. the second unit device, and if an incorrect password is entered a specified number of times during authentication, gives the USB device control unit 3 an instruction to format data in the read/writable region R4. In addition, the auto-starting program P periodically sends specified recognition extension signals to the USB device control unit 3.

On the other hand, in the USB device control unit 3, a formatting unit 36 executes the formatting instruction from the auto-starting program P and a recognition cancellation unit 37 changes the way in which it sends signals to the computer 1 to thereby cancel the recognition of the read/writable region R4 by the computer 1 when the recognition extension signals sent from the auto-starting program P are interrupted for a specified period of time. More specific explanations are provided below.

2-5. Data deletion Due to Password Errors

First, in first embodiment, when a disk is lost, in order to prevent it from being viewed or used for malicious purposes, entering an incorrect password a specified number of times causes data to be formatted or causes the program used to authenticate the password to terminate so as to make password cracking more difficult.

In other words, along with authenticating passwords, the authentication function P2 of the auto-starting program P formats data in the entire specified region of the removable device 2 by sending an instruction to the formatting unit 36 of the USB device control unit 3 when an incorrect password is entered a specified number of times. In addition, the processing performed when a password is entered incorrectly a specified number of times may consist simply in the termination and deletion of the auto-starting program P.

In this manner, even in case of loss, misplacement, theft etc. of the composite device 2, data is protected from unauthorized access by formatting etc. the data when a password error is repeated a specified number of times.

Furthermore, password cracking can be made more difficult if the number of errors allowed before terminating the program is set at random. Also, if password authentication requires a certain time, such as about 0.1 to 0.5 seconds, the user will not experience any inconvenience in normal use, but password cracking based on a brute-force dictionary attack will be made more difficult as well.

In addition, the auto-starting program P may be imparted with a function for rewriting information in the management region R1, or may be enabled to modify the size and attributes of the regions, such as write protection, or to create new regions. In addition, when modifying the regions, there may be situations where it may become necessary to move data, and, for instance, when the respective size of two regions is modified by moving the boundary between them, the auto-starting program P backs up data contained in the regions prior to the modification and temporarily moves it to an empty region of the HDD or memory of the computer 1 or composite device 2, overwrites the region information of the region R1, and returns the backed-up data to the regions after the modification.

2-6. Cancellation of Recognition

In addition, the recognition cancellation unit 37 receives specified recognition extension signals periodically sent from the auto-starting program P and cancels the recognition of specified unit devices by the computer when the signals are interrupted.

In other words, when a program, e.g. the auto-starting program P, utilizing a unit device that requires its contents to be kept in secrecy, such as the security drive, is terminated for any reason, recognition of the unit device is cancelled and access to the composite device 2 from the personal computer is prohibited until the composite device 2 is detached from the personal computer, thereby improving security.

Specifically, every time the recognition cancellation unit 37 receives the recognition extension signal sent from the auto-starting program P, it causes the host side to recognize the unit device operating as a security drive only within a specified time limit, and the auto-starting program P continues to send the recognition extension signals to the recognition cancellation unit 37 at a frequency shorter than the time limit.

3. Effects of First Embodiment

As described above, in first embodiment, sending the computer a signal simulating a first unit device as a device of a specified type (for example, a CD-ROM drive), on which automatic startup of programs, etc. is to be run, causes the execution of the desired programs etc. to be started, even though this is a peripheral device utilizing a USB memory, etc., and a different second unit device is recognized afterwards, at a predetermined timing. As a result, access to the second unit device is limited to the programs etc., which makes it possible to maintain secrecy. In this manner, providing a time difference between the automatic startup of the programs etc. and recognition makes it possible to offer a removable device of superior convenience and security.

In particular, in first embodiment, as a result of running the auto-starting program, recognition of the second unit device is preconditioned by password authentication, such that, if a password is entered incorrectly several times, the device is formatted and, if the program terminates, recognition is canceled, thereby making access difficult except for the auto-starting program, which helps maintain superior security.

In addition, providing a time difference between the automatic startup of programs etc. and recognition, as described above, allows for setting up a digital camera or another peripheral device as a second unit device and carrying out advance installation of its device drivers with the help of the programs, etc. as well as makes it possible to provide a removable device that automatically installs programs and is compact in size because it permits miniaturization using flash memory.

4. Second Embodiment

Figure 2:
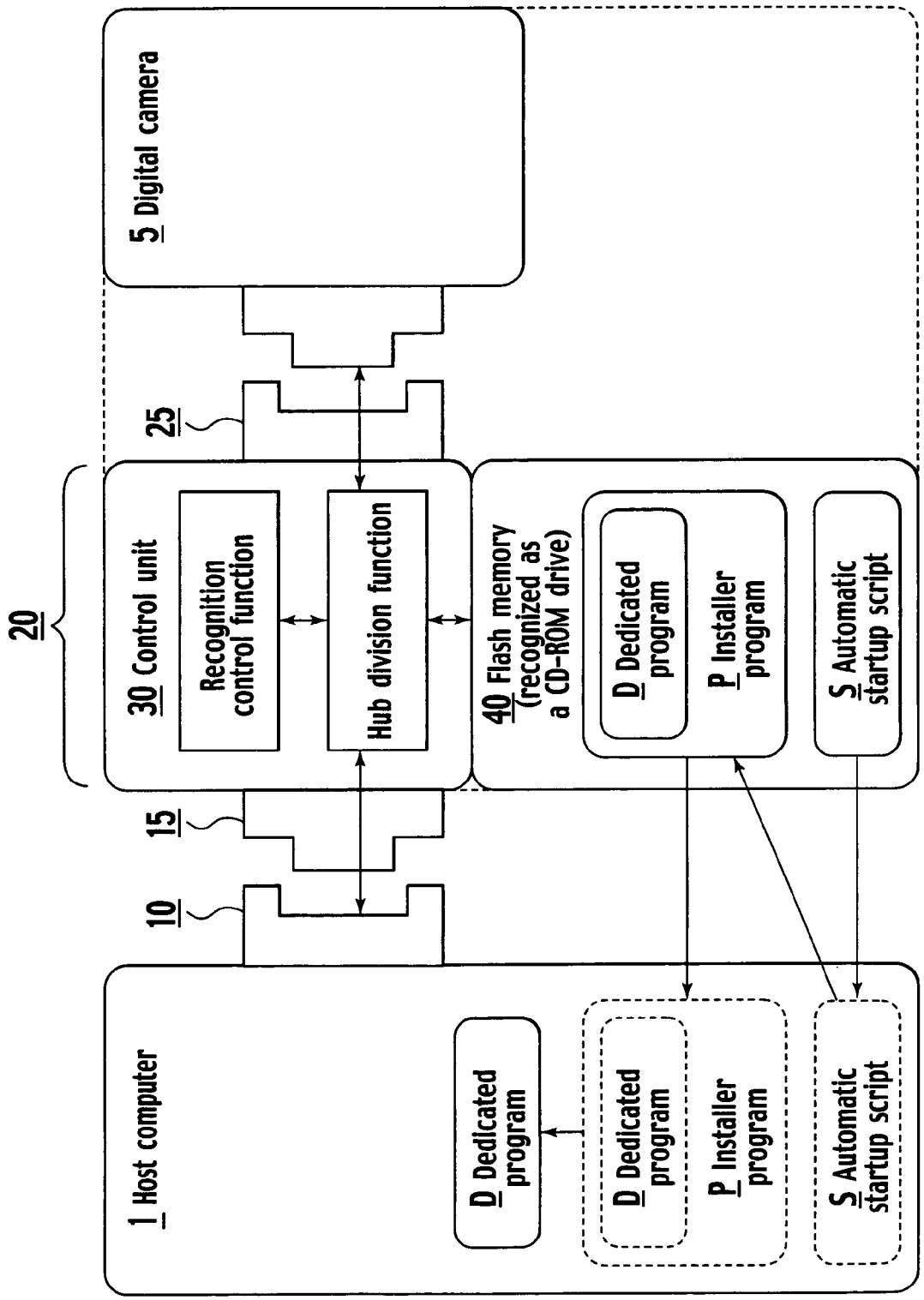
FIG. 2 is a functional block diagram illustrating the configuration of a second embodiment of the present invention.

In the above-described first embodiment, a plurality of devices were handled using hub division, causing respective devices to be recognized by the computer 1 with a certain time difference. The following second embodiment can be implemented by partially modifying it. Here, FIG. 2 illustrates the configuration of second embodiment in simplified form.

Namely, second embodiment is a removable device 20 including a male connector 15 used for attaching the device to a USB port 10 of a computer 1, which executes an automatic startup script stored in the device upon connection of the CD-ROM, a control unit 30, which operates as control means, and a flash memory 40 operating as its main storage device, and including a USB port 25 (female connector) to which another peripheral device (herein, digital camera 5) is connected.

In addition, the control unit 30 has a function (hub division function) for setting up all or part of the flash memory 40 as a first unit device and the other peripheral device as the second unit device, and allocating data exchange with the computer to each of the unit devices, and a function (recognition control function) which, upon connection to the USB port, initially sends the computer 1 a signal simulating a CD-ROM drive on account of the first unit device and then, at a predetermined timing, sends the computer a specified signal for accepting recognition on account of the digital camera 5.

In other words, the two unit devices are divided by the hub, such that the first unit device runs on a driver that comes standard with the OS and the second unit device is required to have a dedicated device driver or another dedicated program D installed thereon, and, when the dedicated program D used for second unit device is present in the first unit device, normal operation is impossible unless recognition is carried out in the following order: recognition of the first unit device→installation of the dedicated program→recognition of the second unit device.

Thus, another peripheral device is connected to the removable device of second embodiment as one of the unit devices. Specifically, as shown in FIG. 2, by providing both male and female connectors on the removable device 20, the digital camera 5 can be connected to the computer 1 via the removable device 20; otherwise, the digital camera 5 can be instead integrated with the removable device 20 as shown with a dotted line in FIG. 2. In such a case, the removable device 20 is manufactured as a module board provided inside the housing of the digital camera's main body and is connected to the circuit board of the digital camera's main body using connectors etc.

In addition, here, the type of applicable devices is not limited to digital cameras, and USB-connected printers, scanners, removable disks and various other drives, various card readers/writers, mobile terminals and other communications devices, etc. sold by various manufacturers can all be used without limitations.

Although most of these devices are not run by drivers that come standard with the OS and in the past it was necessary to install device drivers and other dedicated software programs from separately provided CD-ROMs and other media, in second embodiment, the installation of such device drivers is carried out automatically, thereby allowing the user to save time on operations involving preparing such media for use and installation itself.

In other words, in the past, prior to using a device for the first time, it was necessary to install drivers on the computer using a CD-ROM etc. provided with the device. However, the driver installation procedure, which is burdensome for the user, can be eliminated by saving such drivers to the devices running on drivers that come standard with the OS among the hub-divided unit devices and completing the driver installation procedure using the automatic startup described in first embodiment or manually by the user, and then recognizing the other peripheral device.

In addition, after executing an device driver installation program P, which is an executable file in the EXE format, as an auto-starting program, it is possible to start recognition of the other peripheral device that utilizes the driver.

As described above, in second embodiment, first, a signal simulating the first unit device as a device of a specified type (for example, a CD-ROM drive), on which automatic startup of programs, etc. is to be run, is sent to the computer. For this reason, even though this is a peripheral device using a USB memory, etc., the desired programs etc. can be executed automatically, with the recognition of another, second unit device performed afterwards, at a predetermined timing. Thus, the installation of device drivers and other dedicated programs used for the other peripheral device is facilitated by setting up the second unit device as a digital camera or another peripheral device, and, by providing both male and female connectors on the removable device 20, connecting the other peripheral device to the personal computer via the removable device 20, or by integrating the other peripheral device therewith in the form of a component such as a built-in board, etc. For this reason, there is no longer need to use actual CD-ROMs and other unwieldy storage media and burdensome procedures for dedicated software programs.

If the removable device 20 is integrated with the other peripheral device, the removable device 20 can be set to permit pass-through when connected for the second time or later by controlling its inner circuitry with a changeover switch, thereby establishing a direct connection between the personal computer and the other peripheral device, or, otherwise, whenever connected, it can be caused to proceed with the recognition of the second unit device immediately so long as the programs etc. confirm the presence of the dedicated programs on the PC and their installation is complete. If the removable device 20 is physically separate from the other peripheral device, then the personal computer can be directly linked to the other peripheral device without interposing the removable device 20 in between.

5. Other Modifications

The above-described embodiments illustrated examples, wherein the pre-condition was that the computer executed an automatic startup script and, if it contained relevant instructions, executed the auto-starting program. However, the present invention is, of course, applicable to cases, wherein the computer executes certain programs directly without using a script.

In addition, if device manufacturers, instead of providing device drivers and dedicated device software for each one of their products separately on CD-ROMs or via the Internet, provided all or part of the device drivers and dedicated device software for their various products by storing them in USB devices, then all of the devices of these manufacturers would be easy to use and this might serve as a tool for attracting customers.

In addition, for programs such as installers, an embodiment manually launched by a user is also conceivable. Namely, this embodiment is a removable device attached/detached to/from a universal peripheral device interface of a computer and including control means and a ROM or a read/writable storage device as its main storage device, wherein the removable device includes means for connecting another peripheral device, and the control means includes hub means for setting up all or part of the main storage device as a first unit device and the other peripheral device as a second unit device and allocating data exchange with the computer side to these unit devices, and means which, upon connection to the universal peripheral device interface, initially sends the computer a specified signal used for accepting recognition on account of the first unit device, and, when a program read and executed from the recognized first unit device sends a specified cue signal, sends the computer a specified signal used for accepting recognition on account of the second unit device.

In this embodiment, an installation program stored in advance in the first unit device, which is recognized first, is manually started by the user and a cue signal is sent when the installation is complete, so that recognition of the second unit device is carried out. By doing so, device drivers and other dedicated programs can be readily provided to the user via a compact removable device without using automatic program startup.

6. Third Embodiment

In the removable devices 2 and 20 of the above-described first and second embodiments, the control units 3 and 30 play an important role. Third embodiment gives an example of a removable device 200 (called "the present device" below), which is imparted with functions from both removable devices 2 and 20 and which provides an additional specific embodiment of this control unit. In addition, even better effects in terms of convenience and security are obtained by appropriately combining the various functions described in first to third embodiments.

6-1. Hardware Configuration

Figure 3:
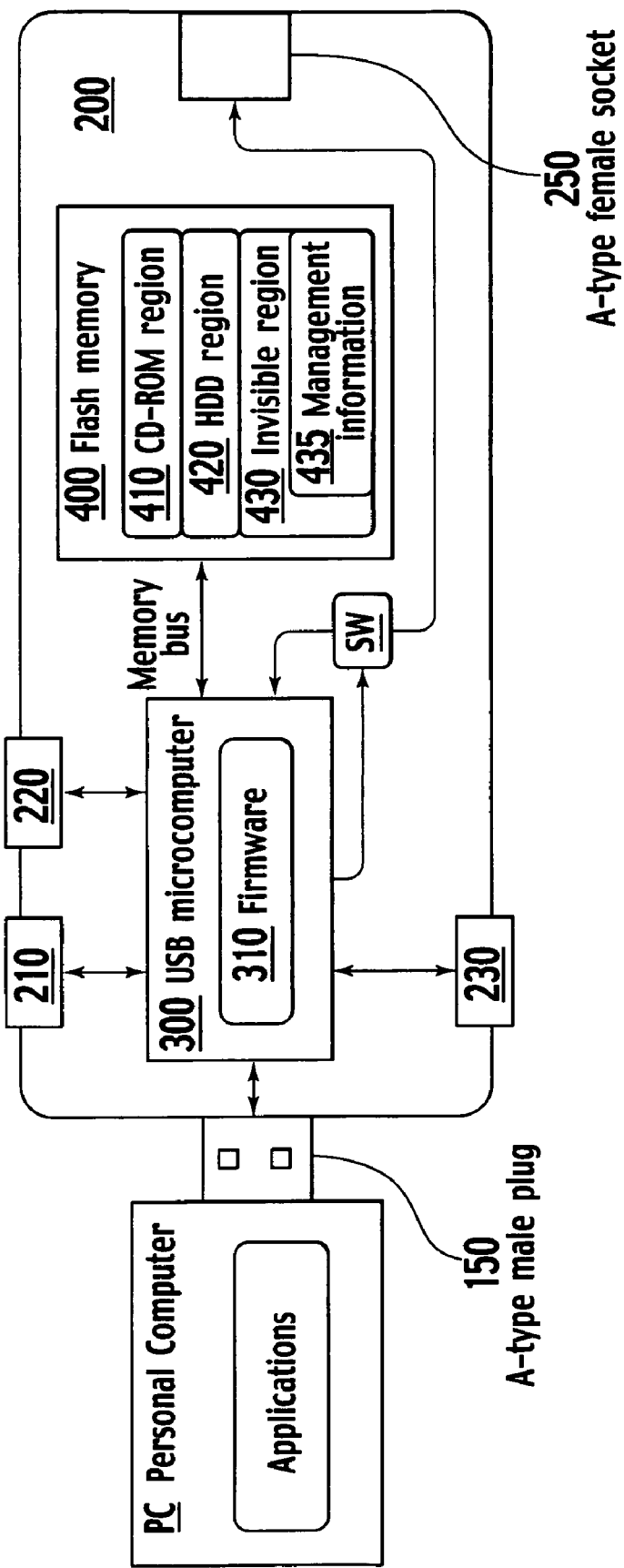
FIG. 3 is a functional block diagram illustrating the hardware configuration of a third embodiment of the present invention.

First of all, an example of the hardware configuration of the present device 200 is illustrated in FIG. 3. Namely, a USB microcomputer 300, such as a RISC microcomputer, acts as a control unit, providing hub functionality according to its firmware 310 in the same manner as control units 3 and 30 in first and second embodiments. In addition, the present device 200 is provided with a flash memory 400 of a specified capacity, such as 32 Mb, 64 Mb, 128 Mb, or 256 Mb, as its main storage device. Here, the flash memory is represented by a rewritable non-volatile memory, but it may be a memory element of a different kind. Furthermore, because non-volatile memory is used as the main storage device in the present invention, it is not limited to memory elements and includes storage devices such as hard disk drives as well, an aspect that is similar to first and second embodiments.

With the help of partitioned management carried out by the USB microcomputer 300, the flash memory 400 provides a CD-ROM region 410, an HDD region 420, and an invisible region 430. It is preferable to use a board layout and circuit configuration that permit mounting of the flash memory 400 on the same board with the USB microcomputer 300.

In addition, for external connections, the present device 200 has at least a male USB series A-type plug 150, which is connected directly to a connector, i.e. socket, of the host side, such as a personal computer (PC) or a PDA. Also, as an option, a series A-type female socket 250 may be installed, which is connected to the hub implemented with the help of the USB microcomputer 300. The female socket 250 is connected to a slave connection port for external device connection provided in the USB microcomputer 300.

The USB interface of the present device 200 complies with USB 2.0 and the hub is typically runs on bus power, but, as an option, it may allow for connecting a self power supply or adapted for using both bus power and self power. With regard to possible implementations of switching between self power and bus power, it should be noted that, for instance, dedicated LSI chips used for hubs are typically provided with such functionality, but depending on the way it is implemented, one is free, e.g., to add the firmware and circuitry to a CPU attached to the hub. In addition, an access LED 210 and a write-protect switch 220 may be furnished to make its operation more convenient.

Additionally, the present device 200, which requires device drivers for the CD-ROM and USB storage to be in the OS, is operated "as is" in case of an OS provided with such drivers on a standard basis and after installation of such device drivers in case of other operating systems. Even when the device drivers are required, the burdensome procedure of restarting the OS is in principle avoided if the device drivers are Plug & Play compliant.

The USB microcomputer 300 used in the above-described Embodiment 3 is a control circuit which, acting as a USB client, mediates access from the host to the rewritable non-volatile memory via the USB and fulfills the functions of the following means.

(1) Means provided with a slave connection port for external device connection that uses partitioned management to divide the flash memory 400 into a plurality of regions, creating a CD-ROM region 410, which is a simulated CD-ROM format-compatible region, and an HDD region 420, which is a removable drive format-compatible region.

(2) Simulated hub means for connecting and disconnecting the regions and external devices attached to the slave connection port to/from the host side as a plurality of unit devices divided by the hub.

(3) Command interpretation means for detecting and executing special commands sent from the host side and including at least commands to connect any of the unit devices.

(4) Means for converting access in CD-ROM format to the format of the flash memory 400 when the host side accesses the CD-ROM region 410 configured in the non-volatile memory using the CD-ROM format.

The fact that such a USB microcomputer 300 allows for connecting and disconnecting the multiple external devices and regions obtained by partitioning the memory to/from the host side using the desired combinations and desired timing makes it possible to realize a highly universal control circuit that can be used both for a security drive, as illustrated by Embodiment 1, and for installation of device drivers used for external peripheral devices, as illustrated by second embodiment. However, the use of the IC, LSI, and other semiconductor chips for implementing the control circuit is not limited to a single chip, and more than one chip can be used.

6-2. Software Configuration

Figure 4:
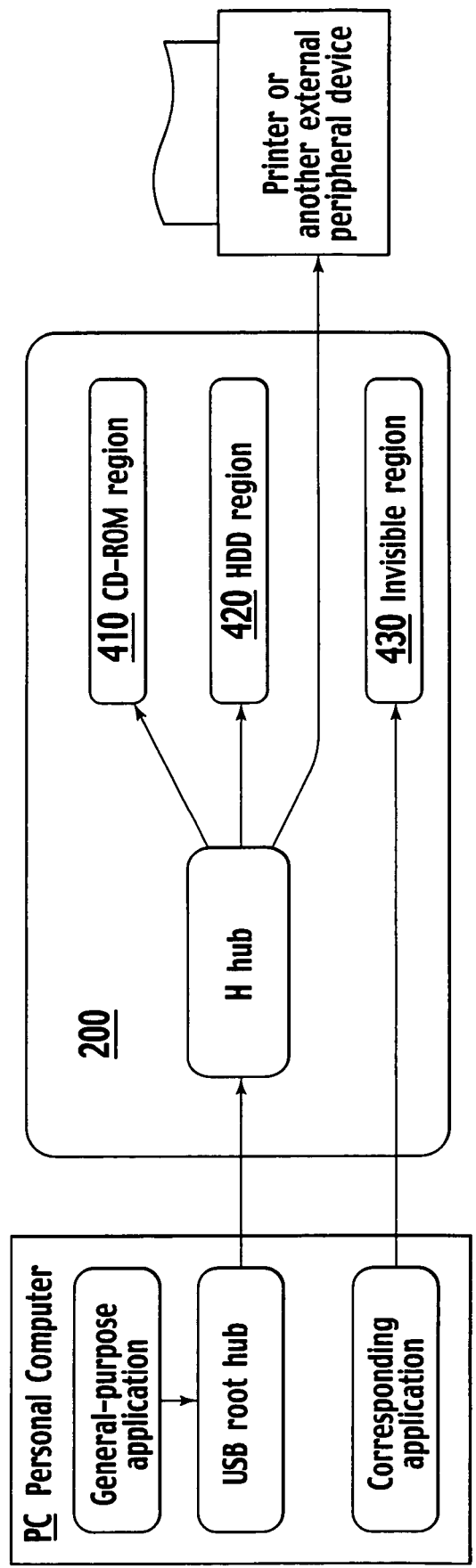
FIG. 4 is a functional block diagram illustrating the software configuration of the third embodiment of the present invention.

More specifically, in the above-described device 200, the software is configured such that, as shown in FIG. 4, the PC is caused to recognize unit devices in the form of the CD-ROM region 410 and HDD region 420 connected via the hub H. In addition, when the external peripheral devices are connected to the female socket 250, the external peripheral devices are also recognized as connected via the hub H.

The connection and disconnection of the unit devices controlled by the hub H to/from the PC located on the upstream, i.e. host side, with the hub H placed in between, is carried out by running the USB microcomputer 300 and firmware 310, by using special commands, which are special-purpose commands issued from applications and other software programs, and by using a physical switch provided in the present device 200. In addition, the connection/disconnection of devices connected on the downstream (slave side) can be performed by turning power supply to the device bus on and off using ICs and transistors.

The CD-ROM region 410 is equivalent to the CD-ROM region R3 of Embodiment 1 and is essential when using the autorun mode (automatic startup) for programs stored and recognized as standard CD-ROM drive-compatible by the host. In addition, "CD-ROM" is just an example, and there are many specific formats that can be freely used, such as CD-ROM (Models 1, 2), CD-RW, CD-DA, CD-XA, CD-I, etc.

Then, as far as the CD-ROM region 410 is concerned, the USB microcomputer 300 stores a disk image in the flash memory 400 and responds to read requests or performs conversion processing between read requests sent from the host in CD-ROM format and data in flash memory 400 at such time. Here, the conversion processing, which serves as a link between the access of the host side to the CD-ROM and the flash memory in this manner, is called "CD-ROM conversion."

Next, the HDD region 420 is recognized by the host as an HDD-compatible standard removable disk drive and is connected to the PC upon authentication, thereby making it possible to provide a storage region of guaranteed security, in the same manner as the read/writable region R4 operating as the second unit device in first embodiment.

In addition, an invisible region 430, which is different from the CD-ROM region 410 and HDD region 420, is provided in the non-volatile memory (flash memory 400) using the partitioned management, and access to information stored in the invisible region 430 is authorized exclusively based on the special commands. Doing so makes it possible to effectively protect IDs, passwords, license keys, partitioned management system information, and other particularly important information from cracking, blocking, and other threats.

The invisible region 430 cannot be directly accessed by the host in the format of a disk drive or other formats, and access thereto is made possible only to programs associated with the present device 200 capable of issuing the special commands. The contents of the information stored in the invisible region is arbitrary, and may, for instance, include device-individually specific identification IDs and other IDs, passwords, partition information regarding the boundary addresses and volumes of each region in the flash memory 400, and other management information 435.

The types of the special commands that programs associated with the present device 200 can use and the processing carried out by the USB microcomputer 300 in response thereto are as follows.

(1) Connecting/disconnecting and acquiring the status of unit devices (2) Reading information in the invisible region (3) Reading individually specific identification numbers (IDs)

(4) Changing the volumes of the regions (5) Rewriting and updating the CD-ROM region The size of the CD-ROM region 410 may be automatically changed depending on the size of the CD-ROM image, with the remaining portion used as the HDD region 420. In addition, for instance, as shown in Embodiment 2, a CD-ROM switch 230 (FIG. 3), which turns the connection of the CD-ROM region 410 to the host side on and off, may be provided to handle termination of device driver installation for external peripheral devices. The switch 230 is connected to a switch port in the USB microcomputer 300. As a result, the CD-ROM region can be disconnected using the switch and kept off, thereby permitting simplification of system configuration and response speed improvements after installing programs such as device drivers for externally connected devices, etc.

In addition, there may be provided a switch for selecting whether to provide a time difference, in other words, a delay, for recognizing the connection of external peripheral devices. Namely, this is a switch used to select whether to immediately connect peripheral devices attached to the slave connection port to the host.

If such a switch is provided, then during the initial connection of external peripheral devices, upon termination of the installation of dedicated programs such as device drivers, the external peripheral devices are connected to the host side, and, during the next connection and later, it becomes possible to immediately connect the peripheral devices to the host side by turning on the switch, thereby enabling system configuration simplification and response speed improvements. In addition, operation is further facilitated if it is also used as a switch for turning the connection of the CD-ROM region 410 to the host side on and off.

In addition, it may be set up to determine whether drivers for external peripheral devices connected downstream have been installed on the personal computer, and, if no device initialization commands arrive from the personal computer within a certain period of time upon connection, to make the determination that the drivers have not been installed, connect the CD-ROM region 410 to the host side, and automatically run the installer.

6-3. Security Login Processing

As described in detail in first embodiment, in order to protect the owner's data while at the same time making it possible to read the data on any PC to which the owner wants to connect the device, the above-described present device 200 is furnished with the following security login function.

Namely, initially only the CD-ROM region 410 becomes connected to the hub when the present device 200 is connected to a personal computer or another host. At this point in time, the HDD region 420 is still disconnected. Then, a program used for authentication is automatically started in the CD-ROM region 410 and, if the password inputted by the user matches the password data and ID stored in the invisible region 430, the HDD region 420 is connected to the hub H and recognized as a drive, thereby making the desired data stored in the HDD region 420 available for reading and editing by the desired programs.

6-4. Example of Processing Procedure

Figure 5:
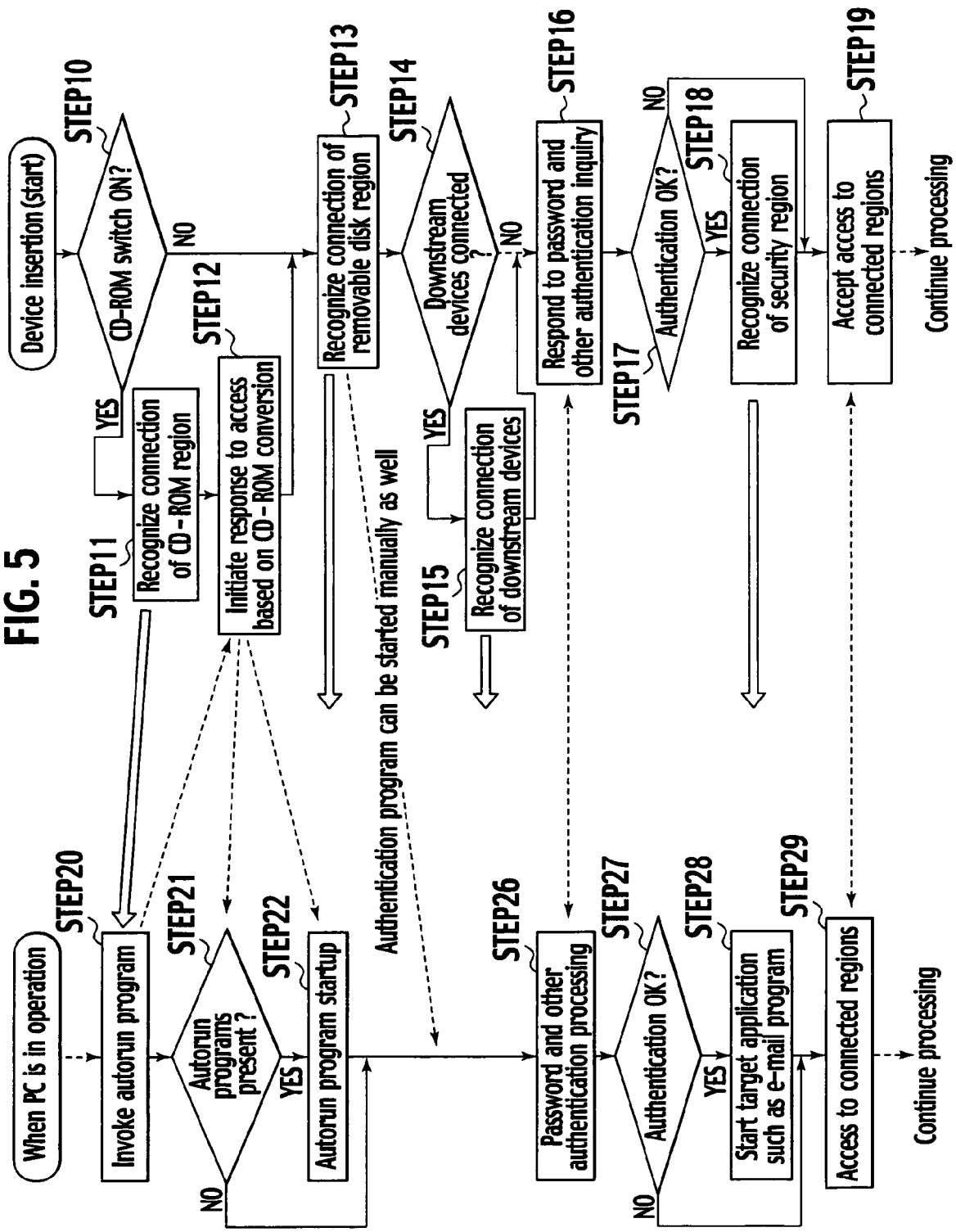
FIG. 5 is a functional block diagram illustrating the processing procedure of the third embodiment of the present invention.

Next, the processing procedure used when the present device 200 is mounted in a PC is illustrated in the flowchart of FIG. 5. Namely, if the CD-ROM switch 230 is turned on (Step 10), the CD-ROM region is connected to and recognized by the PC (Step 11), and response to access is initiated using CD-ROM conversion (Step 12). Using the response, auto-run program call processing is carried out by the PC side (Step 20), and if there is an auto-run program (Step 21), it is started up (Step 22). The auto-run program is typically an authentication program utilizing passwords etc., or a so-called launcher or another menu program.

A removable disk region unconditionally connected to the PC side and a security region, which is also removable disk-compatible but is not connected and recognized prior to authentication, may be provided instead of the HDD region 420 illustrated in FIG. 3. Because in such a case, as shown in FIG. 5, the removable disk region in the present device 200 side is connected to and recognized by the PC (Step 13), the above-described authentication program may be placed in the removable disk region and started manually. Subsequently, if there are devices connected downstream, in other words, on the slave side (called "downstream devices" below) (Step 14), they are connected to and recognized by the PC (Step 15).

In the course of the password-based authentication processing (Step 26) carried out by the authentication program, a password inputted by the user on the PC side is transferred to the present device 200 side and collated with the password contained in the management information 435 of the invisible region 430, with the authentication results reported to the PC side (Step 16). If the authentication status is "OK" (Steps 17, 27), the security region of the present device 200 side is connected to and recognized by the PC (Step 18), and access is accepted to the connected regions (Step 19). On the PC side, if the authentication status is "OK" (Step 27), the e-mail program and other target application programs are started (Step 28), and access is performed as necessary to the connected regions in the present device 200 side (Step 29). In addition, the elements shown in FIGS. 3 to 5 are omitted as necessary depending on the intended use.

6-5. Drive Letters

All the drives on a PC are identified by a drive letter, such as A, C, D, etc., but such drive letters vary depending on the type of the OS, hardware configuration, and other environment parameters. In addition, the drive letters of the multiple unit devices contained in the present device 200 are not necessarily consecutive and this may cause problems such that applications will be unable to identify data location.

As a way of resolving this problem, a built-in function used for acquiring drive letters from the OS of the PC is provided in auto-starting programs and other applications and drive information indicating access destinations in the settings files of the applications is updated using such acquired information. Based on this, regardless of the environment, i.e. the OS, applications and other programs can identify data location in the removable device, thereby enabling smooth access to such data.

6-6. Methods of Accessing Invisible Region

Unlike the normal read/write operations performed by the host side, such as dedicated programs, etc., any arbitrary means for transmitting the special commands and other special access signals to the firmware 310 of the USB microcomputer 300 can be freely selected, with some examples provided below.

For example, a portion of the invisible region is used as one or more settings registers, and, when a certain code is stored in a certain settings register, it is interpreted and executed as a specified special command and, as a result, in accordance with on the type of the command, return codes and values etc. read from the invisible region appear in the form of bit strings in this register or another specified register.

In addition, in accordance with the type and parameters of the commands, patterns corresponding to the commands and their parameters are detected from access to the hub, any of the unit devices, specified physical addresses in any of the unit devices, specified file names, or specified content.

Based these patterns, special commands can be transmitted from the host side to the control circuit using normal read/write access etc. and can be used in many operating systems without special device drivers.

The respective explanations are provided hereinbelow. First of all, operations regarding reading and writing to specific physical addresses, file names, and contents in any of the unit devices are interpreted and executed as commands by the checking function of the control unit. For example, a file with a fixed byte size or zero size is placed in a specified location of the CD-ROM region and access to the invisible region is carried out by accessing it. In addition, the CD-ROM region is recognized as a CD-R, CD-RW, CD-R/W, etc., and write requests that reach the device are treated as special commands. Also, access to the invisible region is realized by using commands that set the spindle rotation frequency of the CD drive, such that, for example, increasing the rotation frequency 4 times is interpreted as a "begin ( )" command, and increasing it 8 times as an "end ( )" command, etc.

In addition, access to the invisible region is realized by interpreting items in the command set concerning the removable disk and the hub that have no meaning for, and are normally not issued by, the Windows™ GUI and standard API (application program interface) as special access signals. In the same manner, items obtained by combining specific commands with specific character strings and other parameters that are not normally used may be treated as access signals as well. In addition, command codes used for firmware version updating that are included in the USB interface class codes on a standard basis are used to supply information for access to the invisible region, such as special commands, etc., to the firmware program's data portion. Separation from actual firmware program data is performed by the USB microcomputer 300 side based on the presence/absence of specified bit patterns.

Also, a fourth device is added to the CD-ROM region 410, HDD (removable disk) region 420 and invisible region 430, with all the commands directed to this device treated as special commands used for the invisible region. In addition, the desired data are supplied to the USB microcomputer 300 by invoking low level drivers directly from the upper-level IoCallDriver ( ). It is also conceivable to create access signals such as special commands by reading and writing values at specified end points.

6-7. Other Modifications

Additionally, the present invention is not limited to the above-described first to third embodiments, and also includes the following other modifications provided by way of example. For instance, in the present Application, the term "USB" is a concept that is not limited to a USB based on a specific standard of the universal peripheral device interface and includes technology that may become available in the future or other standards that may play an equivalent role. In addition, it is possible to implement either the automatic startup or hub division only, so that elements associated with the CD-ROM will be unnecessary if automatic startup is not used. Additionally, embodiments are possible, in which hub division is implemented, but no delay is provided for recognition. Also, a single removable device can be used separately by several people if a plurality of passwords is provided for the security drive.

In addition, the system may be set up to encrypt data recorded in a specified region of the non-volatile memory and decrypt data read therefrom. By doing so, security is strengthened because data saved in sections connected and recognized upon authentication are protected by encryption using, e.g. the private key/public key system, etc.

In addition, IP telephony from the present device via personal computers and IP networks such as the Internet can be used by connecting mobile phones, PHS and other mobile phone terminals as external peripheral devices to the present device using infrared communications, radio communications, plugging into the USB female socket, special connection terminals, etc. and using the send and receive functions of the mobile phone. This makes it easy to user economical and convenient IP telephony of superior security at any time and any place.

Figure 6:
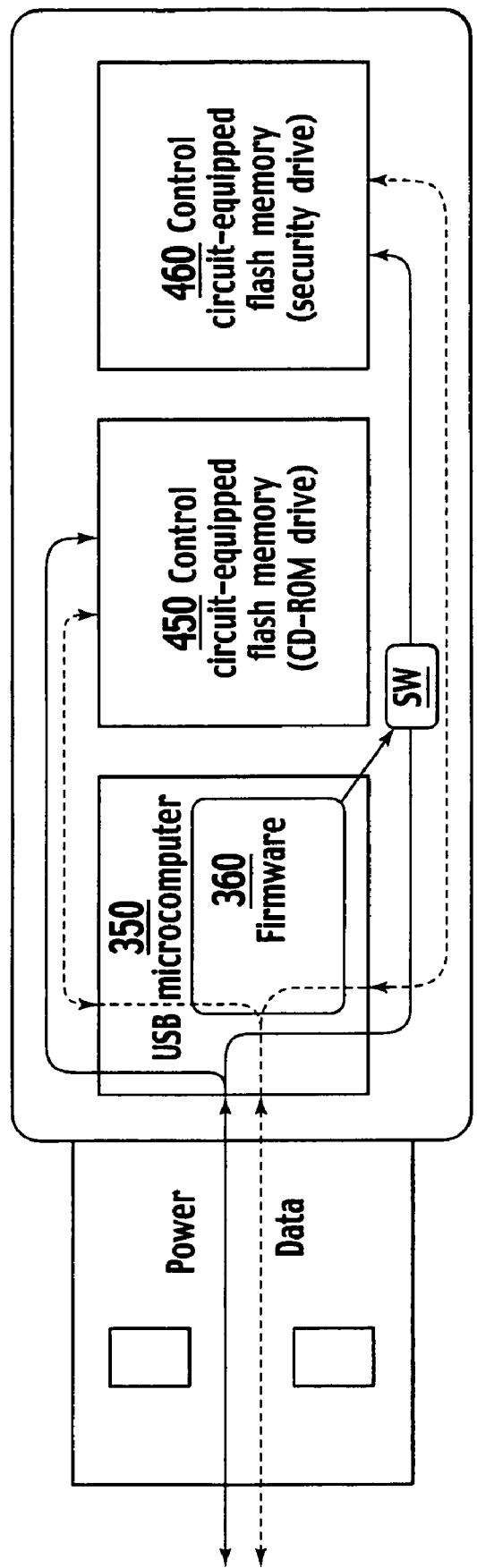
FIG. 6 is a block diagram illustrating another mode of carrying out the present invention.

Additionally, as shown in FIG. 6, the security drive can be realized in a simple configuration utilizing several flash memories with control circuits. For example, a security drive is implemented such that a data line and bus power is provided on a constant basis between the USB microcomputer 350 and a control circuit-equipped flash memory 450, but while a data line is connected between the USB microcomputer 350 and another control circuit-equipped flash memory 460, bus power between them is disconnected using a transistor or IC-based switch SW, with the switch SW connected and the control circuit-equipped flash memory 460 connected and recognized only when the status of password authentication is "OK".

Incidentally, a simpler example of the present invention is a removable device including a rewritable non-volatile memory and control means for mediating access from the USB host side to the memory, wherein the control means, upon connection to the host side, connects a portion of the memory to the host side, and, upon reception of a specified cue signal from the host side, such as some kind of special command, etc., connects the other portion of the memory to the host side, thereby implementing information security for the portion connected later.

In other words, the slave connection port used for external device connection can be omitted, and, in addition, security is not limited to the unit devices divided by the hub and can be implemented by media and file concealment.

In case of media concealment, for example, when a multifunctional device combining a CD-ROM drive and a removable hard disk drive is initialized without a disk inserted into the disk drive, upon authentication, as a result of operations performed by the USB microcomputer, etc., the device is represented as having a disk inserted therein and enabled for access from the PC. By doing so, the scope of possible applications is expanded because different data can be shown prior to and after authentication, as if the disk has been replaced. In addition, in case of file concealment, prior to authentication, the presence of files subject to protection is concealed from the file management region of the hard disk, and after authentication, the presence of all files, including those subject to protection, is disclosed to the host side. In this case, too, information security is implemented because important information is protected from third parties that lack proper authority.

7. Configuration of Fourth Embodiment

Figure 7:
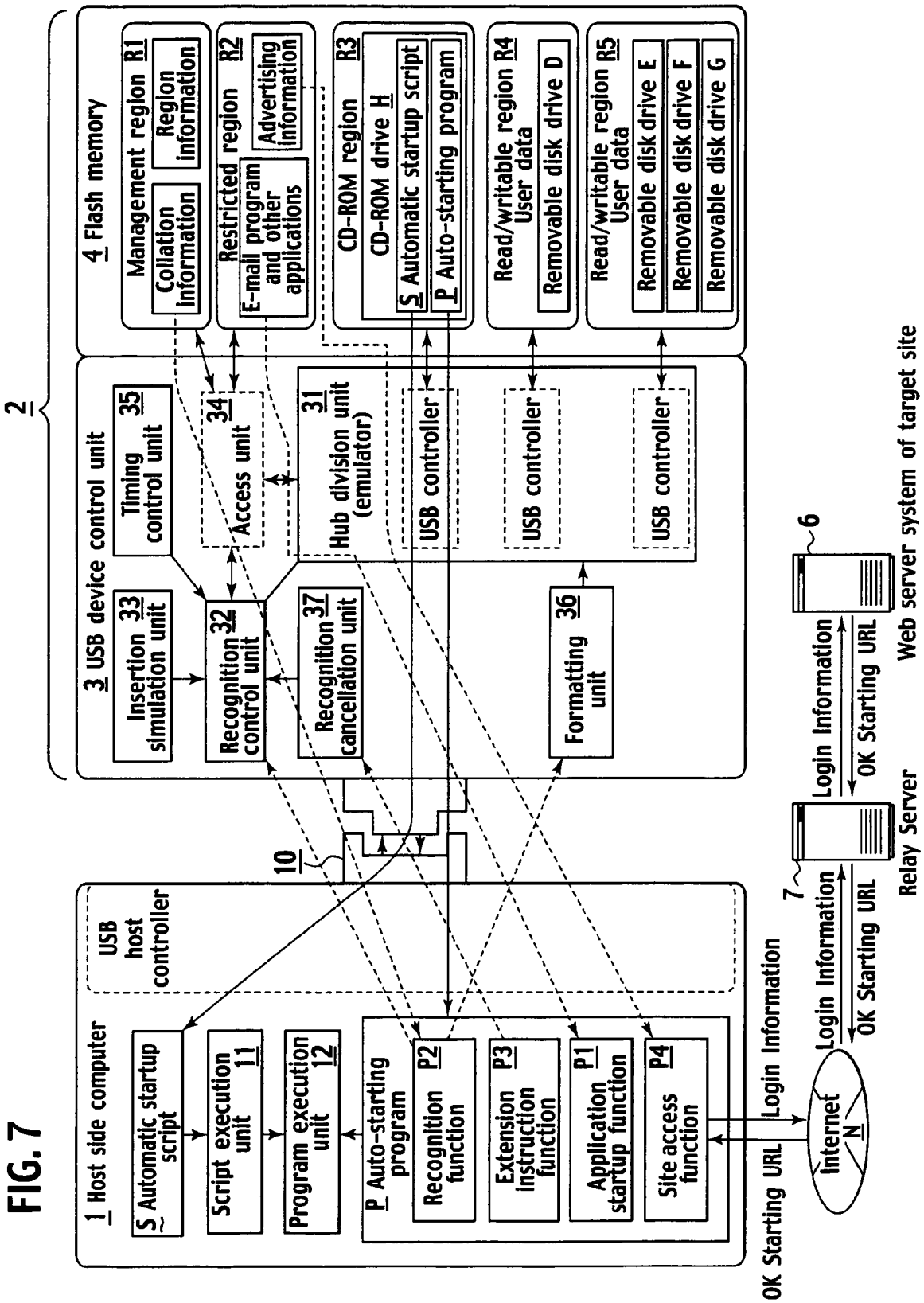
FIG. 7 is a functional block diagram illustrating the configuration of a fourth embodiment of the present invention.

First of all, FIG. 7 is a functional block diagram showing a schematic configuration of fourth embodiment. Specifically, fourth embodiment is a removable composite device (hereinafter called "composite device") 2, which is used by attaching/detaching it to/from a computer 1, and the computer 1 including a USB as a universal peripheral device interface, specifically, a USB port 10, a USB host controller, and device drivers necessary for the USB. Below, in relation to the USB, the computer 1 is called "the host side" or "the computer side."

In addition, the composite device 2 is mounted to a USB port 10 of the computer, and while in this example it includes a read/writable flash memory 4 as its main storage device, a small hard disk drive or a ROM can be also used as the main storage device. Additionally, the composite device 2 includes a USB device control unit 3 as control means.

In the USB device control unit 3, various components shown in FIG. 7 are realized with the help of the wired logic of ASIC chips or other custom chips or based on a combination of a CPU, built-in programs, or micro-programs, etc., and, in addition, in the computer 1, various components shown in FIG. 7 are realized based on the operation of an operating system (called "OS" below) or other programs.

7-1. Hub Division-Related Configuration

A hub division unit 31 of the USB device control unit 3 provides hub means for easily implementing a plurality of functions by performing an operation (called "hub division" below) that allocates data exchange with the computer 1 to a plurality of devices (respectively called "unit devices") in a single composite device 2. As for specific embodiments of hub division, one may consider the following examples.

(1) Miniaturizing and a universal USB hub and incorporating it into the device.
(2) Allowing the USB controller of a single device to manage a plurality of device components.
(3) Emulating the USB controllers of unit devices and the hub with the help of LSI, using ASIC and other custom chips, general-purpose CPUs and built-in programs, etc.

In addition, while it is possible to consider various appropriate combinations thereof, the device emulated here is a USB controller.

Based on this type of hub division, a CD ROM region R3 and read-writable regions R4 and R5 are set up in a storage area of the flash memory 4. Then, a CD-ROM drive (drive letter "H", called the first unit device), which is set up in the CD-ROM region R3, and a removable disk drive (drive letter "D", called the second unit device), which is set up in the read-writable region R4, are used as unit devices, but the regions themselves may be also viewed as unit devices.

Moreover, three removable disk drives (drive letters "E", "F", and "G") are set up in a read-writable region R5 by the hub division unit 31, with the three removable disk drives "E", "F", and "G" also constituting a single unit device. In addition, each removable disk drive "E", "F", and "G" can be individually regarded as a unit device.

Furthermore, a management region R1 and a restricted region R2, which are directly manageable and read/writable only from the access unit 34 of the USB device control unit 3, unlike the above-described unit devices on the USB, which are accessible from the host side, are set up in the storage area of the flash memory 4.

Here, in the regions R1 and R2, access from the OS for writing/deletion and regular recognition, etc. is prohibited, and information that is placed in the region R1 includes, for instance, information necessary for region management, etc. Moreover, in the restricted region R2, access for writing, deletion, etc. through the USB device control unit 3 is permitted only to the auto-starting program P described below, with e-mail programs and other application software, and advertising information, which is described below, kept in this region. However, depending on the configuration, the region may also contain other user data. The data located in the restricted region R2 is protected from accidental erasure and illegal copying.

In addition, to handle information that has to be protected in the devices, a region, which can be read by the host side as a USB-connected unit device but which is write-protected, can be set up instead of the restricted region R2, and the information can be placed in such a region.

The read-writable regions R4 and R5 permit free access as regular removable disks, with presentation materials, word processor documents, address records, and electronic mail data used by e-mail programs placed in this region.

In addition, passwords can be set up for access to each of the regions, with collation information used for password authentication placed in a region inaccessible to the OS, in the same manner as regions R1 and R2.

By using the hub division unit 31, as described above, it becomes possible to set up a plurality of regions as unit devices handled in mutually different ways. For this reason, while the composite device 2 is a removable device including a unit device handled as a CD-ROM based on simulated recognition, when data are saved to such a composite device 2, there is no need to consider the specific file system of an actual CD-ROM. In other words, by setting up other unit devices of the type that does not require data conversion, such as removable disks and HDDs, the data can be easily saved to such devices.

7-2. Simulated Recognition-Related Configuration

In addition, in some computers and operating systems, connecting devices of a specified type and inserting media results in the execution of specified auto-starting programs used for the devices, which are stored, e.g. on the media. This type of operation is called "automatic startup." The specific types of devices that are subject to this type of automatic startup include, for instance, CD-ROM drives. In addition, such operating systems include, e.g. the Microsoft® Windows® series. In addition, such auto-starting programs include, for instance, "Autorun.inf" and similar scripts, as well as programs started by such scripts. The computer 1 in the present embodiment is assumed to be provided with such an OS.

Moreover, in a USB, whenever there is a device that may be mounted to the USB, the host repeatedly sends periodic inquiry signals regarding the type of the device via the USB line, and, in response to the inquiry signals, the device newly mounted to the USB sends the host a reply regarding the device type to which it belongs, causing the host to recognize its connection to the host side. Thus, when a device of the specified type is connected to the computer 1, the script execution unit 11 executes the automatic startup script stored in the device.

Thus, means is provided for accepting recognition such that, when connected to the USB, the recognition control unit 32 of the USB device control unit 3 responds to the host's inquiry signals regarding the type of the device in a simulated manner by sending a signal representing a CD-ROM. Out of the multiple unit devices, the simulated response is provided only with respect to the CD-ROM region R3. Moreover, the automatic startup script and the auto-starting program P launched by the automatic startup script S are stored on the CD-ROM drive H in the CD-ROM region R3.

Specifically, the removable device 2, i.e. the USB memory, is not a target device for script execution, but in response to an inquiry from the host side, the recognition control unit 32 sends a signal representing it in a simulated manner as a target device for automatic startup script execution, such as a CD-ROM drive, etc.

For this reason, even if a resident program used for detection of mounting is not installed on the computer side in advance, the desired processing, such as execution of the program contained in the script, etc., takes place automatically when the device is mounted. As a result, various functions and uses of the device can be implemented even without manually installing dedicated software etc. used for the device. Moreover, automatic startup of the desired programs from the removable device is also easily achieved on computers, where software cannot be installed because the user does not have administrator rights.

7-3. Media Insertion-Related Configuration

Moreover, in the above-described OS, inquiries as to the presence of mounted medium is repeatedly sent to the device, causing it to respond, and, when an "absent" state becomes a "present" state at a certain point in time, the change is recognized as media insertion and the automatic startup is carried out.

Then, as explained above, even in cases where media insertion is a pre-condition for script execution, the script is executed smoothly and reliably because the insertion simulation unit 33 returns a signal of the same pattern as insertion in a simulated manner in response to inquiries as to the presence of media, although, unlike with actual devices, no media insertion is performed when the recognition control unit 32 is caused to respond to the effect that the device is the specified target device (for instance, a CD-ROM drive) for script execution by the computer.

Namely, in response to the USB host controller's inquiry signals as to the presence of media repeated via the USB, the insertion simulation unit 33 returns a signal representing an absence of media at least once, and then, e.g. in response to a second inquiry, returns a signal representing a presence of media.

As a result, the OS of the computer 1 recognizes that media have been inserted and the script execution unit 11 of the computer 1 executes the automatic startup script S stored in the device. Although here the equipment of the "specified type", which is the target of script execution, is assumed to be a "CD-ROM", it can be changed and its scope can be expanded to include other types of devices. In addition, the program execution unit 12 provides means for executing executable files with the ".exe" extension and, so long as there is a record of the directories, names, parameters, etc. of the executable files in the script, executes the executable files in accordance with that information.

In addition, in fourth embodiment, the execution of the auto-starting program P is specified in the automatic startup script S. Of course, in addition to that, the application startup function P1 of the auto-starting program P can be used to invoke, in a derivative manner, applications, such e-mail programs, and device driver installers for other peripheral devices, etc. Below, the derivatively invoked programs are also called auto-starting programs P.

7-4. Configuration Related to Recognition Time Difference

In addition, the timing control unit 35 is a unit that controls the recognition control unit 32 such that it causes the computer 1 to recognize the unit devices at a predetermined sequential timing. In other words, the recognition control unit 32 and the timing control unit 35 constitute means which, upon connection to the USB, initially sends the computer 1 a signal simulating a CD-ROM drive on account of the first unit device, and then, at a predetermined timing, sends the computer 1 a specified signal used for accepting recognition on the account of the second unit device.

Thus, in such a case, immediately upon insertion of the composite device 2 in the computer 1, the timing control unit 35 sends information indicating that only the first unit device has been connected to the host side, and, upon lapse of a specified time period, or as soon as a specified interaction with the host side ends, the host side is sent information indicating that the second unit device has been connected.

As a result, the recognition of the second unit device is delayed by a preset time period or until the end of the specified interaction, which makes it possible to ensure a certain time difference. In addition, as far as the timing of recognition of the second unit device is concerned, instead of allowing only the composite device side to make decisions about timing and conditions as described above, it may be set up to wait for specified instructions regarding recognition from a specified program executed on the host side, and, by doing so, allow the program on the host side to manage the timing of recognition of the second unit device, which makes it possible to confirm completion of the desired processing. For instance, before the recognition of the second unit device is permitted, it may be set up to wait for a notification regarding termination of password authentication or completion of device driver installation.

In addition, instead of the USB device control unit 3, USB controllers may be provided in each individual unit device, with the functions of the timing control unit 35 entrusted to the USB controllers.

Then, one of the uses of the above-described time difference consists in ensuring the necessary installation time for device drivers. In addition, another use of the time difference consists in improving data security so as to prevent easy access to the contents of some devices. This includes prevention of inadvertent deletion by the user of information used to display advertisements to the user.

Specifically, after causing the computer 1 to recognize the first unit device (for example, CD-ROM region R3), the timing control unit 35 is configured to cause the computer 1 to recognize the second unit device (for example, the restricted region R2 and the read/writable region R4) in response to an instruction from the auto-starting program P, and if the auto-starting program P is imparted with a function for authenticating users by passwords, etc., the second unit device can be used as a security drive providing a superior level of security.

The convenience of the thus recognized security drive would be further improved if its recognition could be canceled (by "unplugging the device") manually by performing operations in the task tray etc. in the OS or if its recognition could be canceled as a function of the auto-starting program or another program launched in a derivative manner from the auto-starting program.

In other words, the above-described security drive involves the following processing based on co-operation between the auto-starting program P and the USB device control unit 3. First of all, when a user is authenticated by password, the auto-starting program P gives the USB device control unit 3 an instruction to cause computer 1 to recognize the read/writable region R4, i.e. the second unit device, and if an incorrect password is entered a specified number of times during authentication, gives the USB device control unit 3 an instruction to format data in the read/writable region R4. In addition, the auto-starting program P periodically sends specified recognition extension signals to the USB device control unit 3.

On the other hand, in the USB device control unit 3, a formatting unit 36 executes the formatting instruction obtained from the auto-starting program P and a recognition cancellation unit 37 changes the way in which it sends signals to the computer 1 to thereby cancel the recognition of the read/writable region R4 by the computer 1 when the recognition extension signals sent from the auto-starting program P are interrupted for a specified period of time. More specific explanations are provided below.

7-5. Configuration Related to Data Deletion Due to Password Errors

Namely, in Embodiment 4, when a disk is lost, in order to prevent it from being viewed or maliciously used by other people, entering an incorrect password a specified number of times causes data to be formatted or causes the program used to authenticate the password to terminate so as to make password cracking more difficult.

Namely, along with authenticating passwords, the authentication function P2 of the auto-start program P formats data in the entire specified region of the removable device 2 by sending an instruction to the formatting unit 36 of the USB device control unit 3 when an incorrect password is entered a specified number of times. In addition, the processing used when a password is entered incorrectly a specified number of times may consist simply in the termination and deletion of the auto-starting program P.

In this manner, even in case of loss, misplacement, theft etc. of the composite device 2, data is protected from unauthorized access by formatting etc. the data when a password error is repeated a specified number of times.

Furthermore, password cracking can be made more difficult if the number of errors allowed before terminating the program is set at random. Moreover, if password authentication requires a certain time, such as 0.1 to 0.5 seconds, the user does not experience any inconvenience in normal use, but password cracking based on a brute-force dictionary attack is made more difficult as well.

In addition, the auto-starting program P may be imparted with a function for overwriting information in the management region R1, or may be enabled to modify the size and attributes of the regions, such as write protection, or to create new regions. Additionally, when regions are modified, there may be situations where it becomes necessary to move data, and, for instance, when the respective size of two regions is modified by moving the boundary between them, the auto-start program P backs up data contained in the regions prior to the modification and temporarily moves it to an empty region of the HDD or memory of the computer 1 or the composite device 2, overwrites the region information of the region R1, and returns the backed-up data to the regions after the modification.

7-6. Configuration Related to Cancellation of Recognition

Additionally, the recognition cancellation unit 37 receives specified recognition extension signals periodically sent from the extension instruction function P3 of the auto-starting program P and cancels the recognition of specified unit devices by the computer when the signals are interrupted.

In other words, when a program, e.g. the auto-starting program P, utilizing a unit device that requires its contents to be kept in secrecy, such as the security drive, is terminated for any reason, recognition of the unit device is cancelled and access to the unit device from the PC is prohibited until the composite device 2 is detached from the PC, thereby improving security.

Specifically, whenever the recognition cancellation unit 36 receives the recognition extension signals sent from the auto-starting program P, the host is caused to recognize the unit device that operates as a security drive for a specified time limit and the auto-starting program P continues to send the recognition extension signals to the recognition cancellation unit 36 for a period of time that is shorter than the time limit.

8. Operation of Fifth Embodiment

Fifth embodiment operates in the following manner. In general terms, when the composite device 2 is mounted to the USB port 10 of the computer 1, the USB device control unit 3 initially causes the computer 1 to recognize the CD-ROM region R3 as a CD-ROM, as a result of which the automatic startup script S, and then, the auto-starting program P, which are stored in the CD-ROM region R3, are started up by the computer 1. The auto-starting program P is configured in advance in the following manner.

8-1. Jumping to Sites

The auto-starting program P, along with causing the computer 1 to show, on its screen, graphic elements used for displaying web pages, causes the computer 1 to display the corresponding web pages by launching a web browser provided on the computer 1 or using its own browser in response to specified operations of selecting the graphic elements. Here, such web page display is called "jumping to sites." In addition, the graphic elements used by the auto-starting program P are, for instance, graphic images in the JPEG format, which are stored in advance in specified protected storage regions such as the restricted region R2 and the read/writable region R4 of the composite device 2.

Such specified protected storage regions are implemented in the following manner using the USB device control unit 3, which acts as control means. For instance, the hub division unit 31, along with dividing the flash memory 4 and managing it as a plurality of unit devices including a CD-ROM region R3, which acts as a first unit device that stores the auto-starting program P, and a restricted region R2, which acts as a second unit device that stores the graphic elements, allocates data exchange with the computer side to the unit devices.

In addition, as a result of the operation of the recognition control unit 32, the recognition cancellation unit 37, etc., the USB device control unit 3, upon connection to the USB, initially sends the computer 1 a signal simulating the CD-ROM region R3 as a CD-ROM drive, and then authorizes access to the restricted region R2 only for as long as specified signals are sent from the automatically started auto-starting program P.

8-2. Automatic Log-In

Furthermore, automatic login from the computer 1, which acts as a client system, into a web server can be carried out based on the following login method. Specifically, information (called "target site specification") that specifies a web server system 6 providing the website (called "target website"), into which the user wants to log in, and login information (e.g. IDs and passwords) used for user identification and authentication are stored in the composite device 2 in a mutually referenced form. However, the login information alone is sufficient when there only one web server system 6 and when the corresponding web server system 6 can be identified from the format of the ID, etc.

When the computer attempts to log into the target site as a result of operations performed by the user, the site access function P4 of the auto-starting program P reads the corresponding login information and sends it, along with the target site specification to an application server (called "relay server" below) 7 via the Internet N. The login information is either encrypted and stored in advance or sent after being encrypted.

The relay server 7, which receives the target site specification and the login information, transfers the login information to the web server system 6 of the target site, and, when the web server system 6 of the target site successfully authenticates the user based on the login information, prepares data for a web page shown on a special screen displayed after login specifically to this particular user and communicates the starting URL used for accessing the special screen via the relay server 7 to the browser on the client system utilized by the user.

The display of the URL is implemented using the site jumping function of the browser, scripts and applets, for instance, by launching a browser on the client system and displaying a specified web page on the relay server 7 containing prepared clickable links, such that the user can readily initiate viewing of the special post-login screen, with subsequent site viewing carried out in the same manner as conventionally.

Additionally, the auto-starting program P may be configured to access a predetermined server system and obtain at least either information identifying the web page or information concerning the graphic elements.

In addition, because hub division carried out by the hub division unit 31 makes it possible to simultaneously and easily provide, on a single device, several regions such as writable regions, regions that are write-protected in order to protect data, and regions that are write-protected in order to protect data that possess advertising-related value, such write-protected regions may be used not only to store graphic element information, but also site access-enabled programs themselves.

9. Effects of Fifth Embodiment

As described above, in the present embodiment, even though this is a peripheral device utilizing a USB memory, upon connection to a computer, it sends a signal that simulates a device of a specified type, such as a CD-ROM. For this reason, as a result of running programs automatically starting on the computer, banners pointing to web pages can be displayed even before a user starts a browser, and, moreover, web pages can be preset in advance based on the interests of the user of the removable device, thereby enabling effective advertising. In other words, as a result of the above-described automatic startup, sponsors' icons are displayed automatically and, along with increasing the degree of customer awareness, the method permits easy one-click access to the sponsors' sites by clicking on the icons.

In addition, in the present embodiment, inadvertent erasure of graphic elements used for advertising is prevented by storing them in an invisible, write-protected, and other specified protected storage regions, thereby enabling effective advertising.

In addition, in the present embodiment, the same state is implemented as if a plurality of peripheral devices were connected via a hub using LSI etc. and inadvertent erasure of advertisement-related data, such as image files containing graphic elements, can be prevented by allowing the first unit device to be recognized first, thereby causing the auto-starting program to be started automatically, and then authorizing access to the second unit device only during the operation of the auto-starting program, which has functions enabling it to display the graphic elements, etc.

In addition, in the present embodiment, obtaining web page and graphic element information from a specified server makes effective advertising possible based on using a flexible approach involving modification of the web page and graphic element information in accordance with the rates of access by individual users.

In addition, in the present embodiment, server login is automated, which makes processing faster and easier both when the user receives certain membership services from the server as a result of login and when the user is identified in order to narrow down the target audience of advertising. In addition, the automatic login performed by the program reduces the risk of passwords being recorded and misused by spyware or by a password cache on a borrowed personal computer. In addition, various management functions, such as changing advertisers or establishing access rates for each member, are rendered reliable and easy by logging in via a relay server 7.

In the addition, in the present embodiment, sending the computer a signal simulating a first unit device as a device of a specified type (for example, a CD-ROM drive), on which automatic startup of programs, etc. is to be run, causes the execution of the desired scripts or programs to be started, even though a peripheral device utilizing a USB memory, etc. is used, and a different second unit device is recognized afterwards, at a predetermined timing. As a result, access to the second unit device is limited to the programs etc., which makes it possible to maintain secrecy. In this manner, providing a time difference between the automatic startup of the programs etc. and recognition makes it possible to offer a removable device of superior convenience and security.

In particular, in the present embodiment, as a result of running the auto-starting program, recognition of the second unit device is preconditioned by password authentication, such that, if a password is entered incorrectly several times, the device is formatted and, if the program terminates, recognition is canceled, thereby making access difficult except for the auto-starting program, which helps maintain superior security.

In addition, providing a time difference between the automatic startup of programs etc. and recognition as described above allows for setting up a digital camera or another peripheral device as a second unit device and carrying out advance installation of its device drivers with the help of the programs, etc. as well as makes it possible to provide a removable device that automatically installs programs and is compact in size because it permits miniaturization using flash memory.

10. Other Modifications

The above-described embodiments illustrated examples, wherein the pre-condition was that the computer executed an automatic startup script and, if it contained relevant instructions, executed the auto-starting program. However, the present invention is, of course, applicable to cases, wherein the computer executes certain programs directly without using a script. In addition, the universal peripheral device interface is not limited to the so-called USB and includes technology that may become available in the future and may be implemented using other standards.

In addition, in accordance with the above-described embodiment illustrated in FIG. 7, when device manufacturers provide dedicated software, such as device drivers, etc. for their various products using the removable device of the present invention, programs contained in the removable device can be used to access the websites and web server systems of the manufacturers, where the users can be provided with services including downloading, viewing, and updating of the dedicated software and the associated information.

In addition, as an example of how the above-described automatic login can be applied, a client system logged into the web server system 6, i.e. the computer 1 shown FIG. 7 can be sent new information regarding access to the web page (including information concerning the graphic elements) by the relayed server 7 and the computer 1, along with detecting the arrival of the new information and announcing it by displaying it on screen as a function of the auto-starting program P, may be set up to accept operations used for accessing the web page by way of the above-described site jumping.

By doing so, users who have accessed the web page are presented with news about sales, etc. and other information in a push-type information distribution format, thereby enabling even more effective advertising that matches the interests of the users.

INDUSTRIAL APPLICABILITY

As described above, this invention can provide a removable device and a login method capable of producing superior advertising effects and offering superior convenience and security.

The invention claimed is:

1. A removable device which is attached/detached to/from a universal peripheral device interface of a computer executing a prescribed automatic startup program stored in a specified type of device allowing a medium insertion when the removable device is connected thereto, comprising:
   a controller means; and
   a storage device, wherein the storage device includes;
   a first storage region storing the automatic startup program, the first storage region being used for a first unit device; and
   a second storage region used for a second unit device, and wherein
   the controller means includes
      a hub allocator means for allocating data exchange with the computer to each of the first and second unit devices, and
      a pseudo recognition means which, upon connection to the universal peripheral device interface, first, sends the computer a first signal indicating that the removable device is the specified type of device with respect to the first unit device, and then, sends the computer an absence signal representing an absence of medium at least once, and then sends a presence signal representing a presence of the medium in response to an inquiry signal inquiring the presence of medium to allow the automatic startup script to be automatically executed by the computer, and, second sends the computer a second signal used for accepting recognition with respect to the second unit device, and wherein
      each of the first and second unit devices serves as a unit to which the hub allocator means allocates data exchange with the computer.

2. The removable device according to claim 1, wherein
   the automatic startup program causes the computer to periodically send the removable device a recognition extension signal, and wherein
   the controller means includes a canceller means for receiving the recognition extension signal sent by the automatic startup program, and canceling the recognition of the second unit device by the computer when the recognition extension signal is interrupted for a specified period of time.

3. The removable device according to claim 1, wherein
   the automatic startup program acquires a drive letter of each of the unit devices on the computer and transmits the same to the removable device.

4. The removable device according to claim 1, wherein the first storage region storing the automatic startup program is a ROM or a read/writable storage device.

5. A removable device which is attached/detached to/from a universal peripheral device interface of a computer executing a prescribed automatic startup program stored in a specified type of device allowing a medium insertion when the removable device is connected thereto, comprising:
   a controller means; and
   a storage device, wherein
   the storage device includes:
      a first storage region storing the automatic startup program, the first storage region being used for a first unit device, and
      a second storage region used for a second unit device, and wherein
   the controller means includes
      a hub allocator means for allocating data exchange with the computer to each of the first and second unit devices, and
      a pseudo recognition means which, upon connection to the universal peripheral device interface, first, sends the computer a first signal indicating that the removable device is the specified type of device with respect to the first unit device, and then, sends the computer an absence signal representing an absence of medium at least once, and sends a presence signal representing a presence of the medium in response to an inquiry signal inquiring the presence of medium to allow the automatic startup script to be automatically executed by the computer, and, second, upon instruction from the automatic startup program, sends the computer a second signal used for accepting recognition with respect to the second unit device, and wherein
   said automatic startup program causes the computer to recognize the second unit device, and
   each of the first and second unit devices serves as a unit to which the hub allocator means allocates data exchange with the computer.

6. The removable device according to claim 5, wherein:
   the automatic startup program causes the computer to recognize the second unit device after the computer authenticates a user by password.

7. The removable device according to claim 6, wherein:
   the automatic startup program causes the computer to output an instruction to format data in the second unit device when an incorrect password is entered a prescribed number of times during an authentication.

8. The removable device according to claim 5, wherein:
   the automatic startup program causes the computer to periodically send the removable device a recognition extension signal, and wherein the controller means includes
- a canceller means for receiving the recognition extension signal sent by the automatic startup program, and canceling the recognition of the second unit device by the computer when the recognition extension signal is interrupted for a specified period of time.

9. The removable device according to claim 5, wherein the automatic startup program acquires a drive letter of each of the unit devices on the computer and transmits the same to the removable device.

10. The removable device according to claim 5, wherein the first storage region storing the automatic startup program is a ROM or a read/writable storage device.

11. A removable device which is attached/detached to/from a universal peripheral device interface of a computer executing a prescribed automatic startup program stored in a specified type of device allowing a medium insertion when the removable device is connected thereto, comprising:
- a controller means;
- a connection means for connecting an other peripheral device;
- and a storage device, wherein
the storage device includes:
- a storage region storing the automatic startup program, the storage region being used for a first unit device, and wherein
the controller means includes
- a hub allocator means for setting up the other peripheral device as a second unit device and allocating data exchange with the computer to each of the first and second unit devices, and
- a pseudo recognition means which, upon connection to the universal peripheral device interface, first, sends the computer a first signal indicating that the removable device is the specified type of device with respect to the first unit device, and then, sends the computer an absence signal representing an absence of medium at least once, and, upon instruction from the automatic startup program, sends a presence signal representing a presence of the medium in response to an inquiry signal inquiring the presence of medium to allow the automatic startup script to be automatically executed by the computer, and, second, sends the computer a second signal to allow the second unit device to be recognizable, and wherein
each of the first and second unit devices serves as a unit to which the hub allocator means allocates data exchange with the computer.

12. The removable device according to claim 11, wherein:
the automatic startup program causes the computer to periodically send the removable device a recognition extension signal, and wherein
the controller means includes
- a canceller means for receiving the recognition extension signal sent by the automatic startup program, and canceling the recognition of the second unit device by the computer when the recognition extension signal is interrupted for a specified period of time.

13. The removable device according to claim 11, wherein the first storage region storing the automatic startup program is a ROM or a read/writable storage device.

14. A removable device which is attached/detached to/from a universal peripheral device interface of a computer executing a prescribed automatic startup program stored in a specified type of device allowing a medium insertion when the removable device is connected thereto, comprising:
- a controller means;
- a connection means for connecting an other peripheral device; and a
- storage device, wherein
the storage device includes:
- a storage region storing the automatic startup program, the storage region being used for a first unit device, and wherein
the controller means includes
- a hub allocator means for setting up the other peripheral device as a second unit device and allocating data exchange with the computer to each of the first and second unit devices, and
- a pseudo recognition means which upon connection to the universal peripheral device interface, first, sends the computer a first signal indicating that the removable device is the specified type of device with respect to the first unit device, and then, sends the computer an absence signal representing an absence of medium at least once, and, upon instruction from the automatic startup program, sends a presence signal representing a presence of the medium in response to an inquiry signal inquiring the presence of medium to allow the automatic startup script to be automatically executed by the computer, and, second, upon instruction from the automatic startup program, sends the computer a second signal used for accepting recognition with respect to the second unit device, and wherein
said automatic startup program causes the computer to recognize the second unit device, and
each of the first and second unit devices serves as a unit to which the hub allocator means allocates data exchange with the computer.

15. The removable device according to claim 14, wherein the first storage region storing the automatic startup program is a ROM or a read/writable storage device.

16. A control circuit incorporated into a peripheral device attached/detached to/from a universal peripheral device interface of a computer executing a prescribed automatic startup program stored in a specified type of device allowing a medium insertion when the peripheral device is connected thereto, comprising:
- a pseudo recognition means which, upon connection to the universal peripheral device interface, first, sends the computer a first signal indicating that the peripheral device is the specified type of device with respect to a first unit device, and then, sends the computer an absence signal representing an absence of medium at least once, and then sends a presence signal representing a presence of the medium in response to an inquiry signal inquiring the presence of medium to allow the automatic startup script to be automatically executed by the computer, and, second, sends the computer a second signal used for accepting recognition with respect to a second unit device; and
- a hub allocator means for allocating data exchange with the computer to each of the first and second unit devices, wherein
the automatic startup program is stored in a storage region used for the first unit device.

17. A control circuit incorporated into a peripheral device attached/detached to/from a universal peripheral device interface of a computer executing a prescribed automatic startup program stored in a specified type of device allowing a medium insertion when the peripheral device is connected thereto, comprising:

a pseudo recognition means which, upon connection to the universal peripheral device interface, first, sends the computer a first signal indicating that the peripheral device is the specified type of device with respect to a first unit device, and then, sends the computer an absence signal representing an absence of medium at least once, and then sends a presence signal representing a presence of the medium in response to an inquiry signal inquiring the presence of medium to allow the automatic startup script to be automatically executed by the computer, and, second, upon an instruction from the automatic startup program, sends the computer a second signal used for accepting recognition with respect to a second unit device; and a hub allocator means for allocating data exchange with the computer to each of the first and second unit devices, wherein said automatic startup program causes the computer to recognize the second unit device, and the automatic startup program is stored in a storage region used for the first unit device.

* * * * *